US012512600B2

(12) United States Patent
Mohan et al.

(10) Patent No.: US 12,512,600 B2
(45) Date of Patent: Dec. 30, 2025

(54) HUYGENS LENS FOR HIGHER ANTENNA GAIN

(71) Applicants: NANYANG TECHNOLOGICAL UNIVERSITY, Singapore (SG); NCS PTE. LTD., Singapore (SG)

(72) Inventors: Manoj Prabhakar Mohan, Singapore (SG); Muhammad Faeyz Karim, Singapore (SG); Guopeng Zhao, Singapore (SG); Juan Miguel Jimeno, Singapore (SG); Ai Qun Liu, Singapore (SG); Arokiaswami Alphones, Singapore (SG); Mohammed Yakoob Siyal, Singapore (SG)

(73) Assignees: NANYANG TECHNOLOGICAL UNIVERSITY, Singapore (SG); NCS PTE. LTD., Singapore (SG)

( * ) Notice: Subject to any disclaimer, the term of this patent is extended or adjusted under 35 U.S.C. 154(b) by 125 days.

(21) Appl. No.: 18/694,541

(22) PCT Filed: Sep. 27, 2022

(86) PCT No.: PCT/SG2022/050690
§ 371 (c)(1),
(2) Date: Mar. 22, 2024

(87) PCT Pub. No.: WO2023/055294
PCT Pub. Date: Apr. 6, 2023

(65) Prior Publication Data

US 2024/0332815 A1 Oct. 3, 2024

(30) Foreign Application Priority Data

Sep. 28, 2021 (SG) ............................ 10202110750T

(51) Int. Cl.
*H01Q 15/08* (2006.01)
*H01Q 15/24* (2006.01)

(52) U.S. Cl.
CPC ........... *H01Q 15/08* (2013.01); *H01Q 15/242* (2013.01)

(58) Field of Classification Search
CPC ...... H01Q 15/08; H01Q 15/242; H01Q 15/02; G02B 1/002
See application file for complete search history.

(56) References Cited

U.S. PATENT DOCUMENTS 11,011,834 B2 * 5/2021 Xu ......................... H01Q 15/02
2012/0280872 A1 * 11/2012 Werner .................. H01Q 15/02 343/753

(Continued)

FOREIGN PATENT DOCUMENTS

CN 108199148 A * 6/2018 ............. H01Q 15/00
CN 111009728 A * 4/2020 ............. H01Q 15/02

(Continued)

OTHER PUBLICATIONS

Fernandes C.A., Lima E.B., Costa J.R. (2015) Dielectric Lens Antennas. In: Chen Z. (eds) Handbook of Antenna Technologies. Springer, Singapore.

(Continued)

*Primary Examiner* — Seokjin Kim
(74) *Attorney, Agent, or Firm* — Barnes & Thornburg LLP

(57) ABSTRACT

A Huygens lens is disclosed. The Huygens lens includes a substrate of a dielectric material, the substrate having a first substrate surface and a second substrate surface opposing the first substrate surface. The Huygens lens includes first conductive elements disposed on the first substrate surface and second conductive elements disposed on the second (Continued)

substrate surface. The second conductive elements are electrically insulated from the first conductive elements by the substrate. The first conductive elements and the second conductive elements form an array of a plurality of unit cells, the array having a concentric phase distribution, each of the plurality of unit cells being operable within a range of frequencies, the range of frequencies including at least a part of a W-band of an electromagnetic spectrum.

19 Claims, 15 Drawing Sheets

(56) References Cited

U.S. PATENT DOCUMENTS

| | | | | |
|---|---|---|---|---|
| 2014/0009365 | A1* | 1/2014 | Roy | H01Q 15/24<br>343/909 |
| 2014/0180604 | A1* | 6/2014 | Corcos | G01J 5/20<br>702/32 |
| 2021/0184351 | A1* | 6/2021 | Eleftheriades | H01Q 3/2658 |
| 2021/0184365 | A1* | 6/2021 | Park | H01Q 15/0086 |
| 2022/0330259 | A1* | 10/2022 | Jamieson | H04W 72/542 |
| 2022/0337096 | A1* | 10/2022 | Davlantes | H02J 50/50 |
| 2023/0108106 | A1* | 4/2023 | Edwards | H10F 39/8023<br>257/292 |
| 2024/0347922 | A1* | 10/2024 | Ho | H01Q 19/065 |
| 2025/0149799 | A1* | 5/2025 | Cacocciola | H01Q 21/061 |

FOREIGN PATENT DOCUMENTS

| | | | | |
|---|---|---|---|---|
| CN | 111834752 A | * | 10/2020 | H01Q 1/241 |
| CN | 115764306 A | * | 3/2023 | |
| CN | 118073871 A | * | 5/2024 | H01Q 1/36 |
| KR | 102375208 B1 | * | 3/2022 | G02B 1/002 |

OTHER PUBLICATIONS

E. Erfani, M. Niroo-Jazi and S. Tatu, “A High-Gain Broadband Gradient Refractive Index Metasurface Lens Antenna,” in IEEE Transactions on Antennas and Propagation, vol. 64, No. 5, pp. 1968-1973, May 2016.

K. M. R. Islam and S. Choi, “Compact Double-Layer FR4-Based Focusing Lens Using High-Efficiency Huygens’ Metasurface Unit Cells,” Sensors, vol. 20, No. 21, p. 6142, Oct. 2020.

C. Xue, J. Sun, L. Niu, Q. Lou, “Ultrathin Dual-Polarized Huygens’ Metasurface: Design and Application”. Annalen der physik, vol. 532, No. 7, p. 2000151, Jun. 2020.

C. Xue, Q. Lou and Z. N. Chen, “Broadband Double-Layered Huygens’ Metasurface Lens Antenna for 5G Millimeter-Wave Systems,” in IEEE Transactions on Antennas and Propagation, vol. 68, No. 3, pp. 1468-1476, Mar. 2020.

International Search Report and Written Opinion for PCT/SG2022/050690, mailed on Apr. 24, 2023.

Olk A. E. et al., Huygens Metasurface Lens for W-Band Switched Beam Antenna Applications. IEEE Open Journal of Antennas and Propagation, Jun. 19, 2020, vol. 1, pp. 290-299.

Bayat-Makou N. et al., Omega Bianisotropic Huygens’ Metamaterial Lens for Matching Improvement of W-Band Substrate Integrated E-Plane Horn. 2021 15th European Conference on Antennas and Propagation (EuCAP), Mar. 26, 2021, pp. 1-4.

Sakurai, S. et al., Millimeter-Wave Huygens’ Transmit Arrays Based on Coupled Metallic Resonators. IEEE Transactions on Antennas and Propagation, Oct. 20, 2020, vol. 69, No. 5, pp. 2686-2696.

* cited by examiner

| c \ m | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 1 | 17.43 | 290 | 209.9 | 137.2 | 72.37 | 15.58 | 327.1 | 287.1 | 255.8 | 233.4 | 219.9 | 215.4 | 219.9 | 233.4 | 255.8 | 287.1 | 327.1 | 15.58 | 72.37 | 137.2 | 209.9 | 290 | 17.43 |
| 2 | 290 | 201.4 | 120 | 46.23 | 340.4 | 282.7 | 233.4 | 192.8 | 160.9 | 138.1 | 124.4 | 119.8 | 124.4 | 138.1 | 160.9 | 192.8 | 233.4 | 282.7 | 340.4 | 46.23 | 120 | 201.4 | 290 |
| 3 | 209.9 | 120 | 37.49 | 322.7 | 255.8 | 197.3 | 147.3 | 106 | 73.67 | 50.48 | 36.51 | 31.85 | 36.51 | 50.48 | 73.67 | 106 | 147.3 | 197.3 | 255.8 | 322.7 | 37.49 | 120 | 209.9 |
| 4 | 137.2 | 46.23 | 322.7 | 246.9 | 179.1 | 119.8 | 69.04 | 27.18 | 354.4 | 330.9 | 316.7 | 312 | 316.7 | 330.9 | 354.4 | 27.18 | 69.04 | 119.8 | 179.1 | 246.9 | 322.7 | 46.23 | 137.2 |
| 5 | 72.37 | 340.4 | 255.8 | 179.1 | 110.6 | 50.48 | 359.1 | 316.7 | 283.5 | 259.6 | 245.3 | 240.5 | 245.3 | 259.6 | 283.5 | 316.7 | 359.1 | 50.48 | 110.6 | 179.1 | 255.8 | 340.4 | 72.37 |
| 6 | 15.58 | 282.7 | 197.3 | 119.8 | 50.48 | 349.7 | 297.7 | 254.9 | 221.3 | 197.1 | 182.6 | 177.8 | 182.6 | 197.1 | 221.3 | 254.9 | 297.7 | 349.7 | 50.48 | 119.8 | 197.3 | 282.7 | 15.58 |
| 7 | 327.1 | 233.4 | 147.3 | 69.04 | 359.1 | 297.7 | 245.3 | 202 | 168 | 143.7 | 129 | 124.1 | 129 | 143.7 | 168 | 202 | 245.3 | 297.7 | 359.1 | 69.04 | 147.3 | 233.4 | 327.1 |
| 8 | 287.1 | 192.8 | 106 | 27.18 | 316.7 | 254.9 | 202 | 158.3 | 124.1 | 99.51 | 84.7 | 79.76 | 84.7 | 99.51 | 124.1 | 158.3 | 202 | 254.9 | 316.7 | 27.18 | 106 | 192.8 | 287.1 |
| 9 | 255.8 | 160.9 | 73.67 | 354.4 | 283.5 | 221.3 | 168 | 124.1 | 89.64 | 64.9 | 49.99 | 45.02 | 49.99 | 64.9 | 89.64 | 124.1 | 168 | 221.3 | 283.5 | 354.4 | 73.67 | 160.9 | 255.8 |
| 10 | 233.4 | 138.1 | 50.48 | 330.9 | 259.6 | 197.1 | 143.7 | 99.51 | 64.9 | 40.03 | 25.06 | 20.06 | 25.06 | 40.03 | 64.9 | 99.51 | 143.7 | 197.1 | 259.6 | 330.9 | 50.48 | 138.1 | 233.4 |
| 11 | 219.9 | 124.4 | 36.51 | 316.7 | 245.3 | 182.6 | 129 | 84.7 | 49.99 | 25.06 | 10.04 | 5.022 | 10.04 | 25.06 | 49.99 | 84.7 | 129 | 182.6 | 245.3 | 316.7 | 36.51 | 124.4 | 219.9 |
| 12 | 215.4 | 119.8 | 31.85 | 312 | 240.5 | 177.8 | 124.1 | 79.76 | 45.02 | 20.06 | 5.022 | 0 | 5.022 | 20.06 | 45.02 | 79.76 | 124.1 | 177.8 | 240.5 | 312 | 31.85 | 119.8 | 215.4 |
| 13 | 219.9 | 124.4 | 36.51 | 316.7 | 245.3 | 182.6 | 129 | 84.7 | 49.99 | 25.06 | 10.04 | 5.022 | 10.04 | 25.06 | 49.99 | 84.7 | 129 | 182.6 | 245.3 | 316.7 | 36.51 | 124.4 | 219.9 |
| 14 | 233.4 | 138.1 | 50.48 | 330.9 | 259.6 | 197.1 | 143.7 | 99.51 | 64.9 | 40.03 | 25.06 | 20.06 | 25.06 | 40.03 | 64.9 | 99.51 | 143.7 | 197.1 | 259.6 | 330.9 | 50.48 | 138.1 | 233.4 |
| 15 | 255.8 | 160.9 | 73.67 | 354.4 | 283.5 | 221.3 | 168 | 124.1 | 89.64 | 64.9 | 49.99 | 45.02 | 49.99 | 64.9 | 89.64 | 124.1 | 168 | 221.3 | 283.5 | 354.4 | 73.67 | 160.9 | 255.8 |
| 16 | 287.1 | 192.8 | 106 | 27.18 | 316.7 | 254.9 | 202 | 158.3 | 124.1 | 99.51 | 84.7 | 79.76 | 84.7 | 99.51 | 124.1 | 158.3 | 202 | 254.9 | 316.7 | 27.18 | 106 | 192.8 | 287.1 |
| 17 | 327.1 | 233.4 | 147.3 | 69.04 | 359.1 | 297.7 | 245.3 | 202 | 168 | 143.7 | 129 | 124.1 | 129 | 143.7 | 168 | 202 | 245.3 | 297.7 | 359.1 | 69.04 | 147.3 | 233.4 | 327.1 |
| 18 | 15.58 | 282.7 | 197.3 | 119.8 | 50.48 | 349.7 | 297.7 | 254.9 | 221.3 | 197.1 | 182.6 | 177.8 | 182.6 | 197.1 | 221.3 | 254.9 | 297.7 | 349.7 | 50.48 | 119.8 | 197.3 | 282.7 | 15.58 |
| 19 | 72.37 | 340.4 | 255.8 | 179.1 | 110.6 | 50.48 | 359.1 | 316.7 | 283.5 | 259.6 | 245.3 | 240.5 | 245.3 | 259.6 | 283.5 | 316.7 | 359.1 | 50.48 | 110.6 | 179.1 | 255.8 | 340.4 | 72.37 |
| 20 | 137.2 | 46.23 | 322.7 | 246.9 | 179.1 | 119.8 | 69.04 | 27.18 | 354.4 | 330.9 | 316.7 | 312 | 316.7 | 330.9 | 354.4 | 27.18 | 69.04 | 119.8 | 179.1 | 246.9 | 322.7 | 46.23 | 137.2 |
| 21 | 209.9 | 120 | 37.49 | 322.7 | 255.8 | 197.3 | 147.3 | 106 | 73.67 | 50.48 | 36.51 | 31.85 | 36.51 | 50.48 | 73.67 | 106 | 147.3 | 197.3 | 255.8 | 322.7 | 37.49 | 120 | 209.9 |
| 22 | 290 | 201.4 | 120 | 46.23 | 340.4 | 282.7 | 233.4 | 192.8 | 160.9 | 138.1 | 124.4 | 119.8 | 124.4 | 138.1 | 160.9 | 192.8 | 233.4 | 282.7 | 340.4 | 46.23 | 120 | 201.4 | 290 |
| 23 | 17.43 | 290 | 209.9 | 137.2 | 72.37 | 15.58 | 327.1 | 287.1 | 255.8 | 233.4 | 219.9 | 215.4 | 219.9 | 233.4 | 255.8 | 287.1 | 327.1 | 15.58 | 72.37 | 137.2 | 209.9 | 290 | 17.43 |

FIG. 3A

100

200

| n \ m | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 1 | 15.74 | 299.5 | 193.4 | 158.7 | 75.9 | 15.74 | 326.8 | 286 | 260.6 | 226 | 226 | 226 | 226 | 226 | 260.6 | 286 | 326.8 | 15.74 | 75.9 | 158.7 | 193.4 | 299.5 | 15.74 |
| 2 | 299.5 | 193.4 | 99.44 | 21.53 | 348.2 | 286 | 226 | 193.4 | 164.9 | 158.7 | 99.44 | 99.44 | 99.44 | 158.7 | 164.9 | 193.4 | 226 | 286 | 348.2 | 21.53 | 99.44 | 193.4 | 299.5 |
| 3 | 193.4 | 99.44 | 20.49 | 326.8 | 260.6 | 193.4 | 158.7 | 99.44 | 75.9 | 75.9 | 20.49 | 20.49 | 20.49 | 75.9 | 75.9 | 99.44 | 158.7 | 193.4 | 260.6 | 326.8 | 20.49 | 99.44 | 193.4 |
| 4 | 158.7 | 21.53 | 326.8 | 247.5 | 177.2 | 99.44 | 75.9 | 15.74 | 348.2 | 326.8 | 312.3 | 312.3 | 312.3 | 326.8 | 348.2 | 15.74 | 75.9 | 99.44 | 177.2 | 247.5 | 326.8 | 21.53 | 158.7 |
| 5 | 75.9 | 348.2 | 260.6 | 177.2 | 99.44 | 75.9 | 348.2 | 312.3 | 286 | 260.6 | 247.5 | 247.5 | 247.5 | 260.6 | 286 | 312.3 | 348.2 | 75.9 | 99.44 | 177.2 | 260.6 | 348.2 | 75.9 |
| 6 | 15.74 | 286 | 193.4 | 99.44 | 75.9 | 348.2 | 299.5 | 260.6 | 226 | 193.4 | 186.1 | 177.2 | 186.1 | 193.4 | 226 | 260.6 | 299.5 | 348.2 | 75.9 | 99.44 | 193.4 | 286 | 15.74 |
| 7 | 326.8 | 226 | 158.7 | 75.9 | 348.2 | 299.5 | 247.5 | 193.4 | 164.9 | 158.7 | 99.44 | 99.44 | 99.44 | 158.7 | 164.9 | 193.4 | 247.5 | 299.5 | 348.2 | 75.9 | 158.7 | 226 | 326.8 |
| 8 | 286 | 193.4 | 99.44 | 15.74 | 312.3 | 260.6 | 193.4 | 158.7 | 99.44 | 96.43 | 96.43 | 75.9 | 96.43 | 96.43 | 99.44 | 158.7 | 193.4 | 260.6 | 312.3 | 15.74 | 99.44 | 193.4 | 286 |
| 9 | 260.6 | 164.9 | 75.9 | 348.2 | 286 | 226 | 164.9 | 99.44 | 96.43 | 75.9 | 21.53 | 21.53 | 21.53 | 75.9 | 96.43 | 99.44 | 164.9 | 226 | 286 | 348.2 | 75.9 | 164.9 | 260.6 |
| 10 | 226 | 158.7 | 75.9 | 326.8 | 260.6 | 193.4 | 158.7 | 96.43 | 75.9 | 21.53 | 15.74 | 15.74 | 15.74 | 21.53 | 75.9 | 96.43 | 158.7 | 193.4 | 260.6 | 326.8 | 75.9 | 158.7 | 226 |
| 11 | 226 | 99.44 | 20.49 | 312.3 | 247.5 | 186.1 | 99.44 | 96.43 | 21.53 | 15.74 | 13.85 | 0.75 | 13.85 | 15.74 | 21.53 | 96.43 | 99.44 | 186.1 | 247.5 | 312.3 | 20.49 | 99.44 | 226 |
| 12 | 226 | 99.44 | 20.49 | 312.3 | 247.5 | 177.2 | 99.44 | 75.9 | 21.53 | 15.74 | 0.75 | 0.75 | 0.75 | 15.74 | 21.53 | 75.9 | 99.44 | 177.2 | 247.5 | 312.3 | 20.49 | 99.44 | 226 |
| 13 | 226 | 99.44 | 20.49 | 312.3 | 247.5 | 186.1 | 99.44 | 96.43 | 21.53 | 15.74 | 13.85 | 0.75 | 13.85 | 15.74 | 21.53 | 96.43 | 99.44 | 186.1 | 247.5 | 312.3 | 20.49 | 99.44 | 226 |
| 14 | 226 | 158.7 | 75.9 | 326.8 | 260.6 | 193.4 | 158.7 | 96.43 | 75.9 | 21.53 | 15.74 | 15.74 | 15.74 | 21.53 | 75.9 | 96.43 | 158.7 | 193.4 | 260.6 | 326.8 | 75.9 | 158.7 | 226 |
| 15 | 260.6 | 164.9 | 75.9 | 348.2 | 286 | 226 | 164.9 | 99.44 | 96.43 | 75.9 | 21.53 | 21.53 | 21.53 | 75.9 | 96.43 | 99.44 | 164.9 | 226 | 286 | 348.2 | 75.9 | 164.9 | 260.6 |
| 16 | 286 | 193.4 | 99.44 | 15.74 | 312.3 | 260.6 | 193.4 | 158.7 | 99.44 | 96.43 | 96.43 | 75.9 | 96.43 | 96.43 | 99.44 | 158.7 | 193.4 | 260.6 | 312.3 | 15.74 | 99.44 | 193.4 | 286 |
| 17 | 326.8 | 226 | 158.7 | 75.9 | 348.2 | 299.5 | 247.5 | 193.4 | 164.9 | 158.7 | 99.44 | 99.44 | 99.44 | 158.7 | 164.9 | 193.4 | 247.5 | 299.5 | 348.2 | 75.9 | 158.7 | 226 | 326.8 |
| 18 | 15.74 | 286 | 193.4 | 99.44 | 75.9 | 348.2 | 299.5 | 260.6 | 226 | 193.4 | 186.1 | 177.2 | 186.1 | 193.4 | 226 | 260.6 | 299.5 | 348.2 | 75.9 | 99.44 | 193.4 | 286 | 15.74 |
| 19 | 75.9 | 348.2 | 260.6 | 177.2 | 99.44 | 75.9 | 348.2 | 312.3 | 286 | 260.6 | 247.5 | 247.5 | 247.5 | 260.6 | 286 | 312.3 | 348.2 | 75.9 | 99.44 | 177.2 | 260.6 | 348.2 | 75.9 |
| 20 | 158.7 | 21.53 | 326.8 | 247.5 | 177.2 | 99.44 | 75.9 | 15.74 | 348.2 | 326.8 | 312.3 | 312.3 | 312.3 | 326.8 | 348.2 | 15.74 | 75.9 | 99.44 | 177.2 | 247.5 | 326.8 | 21.53 | 158.7 |
| 21 | 193.4 | 99.44 | 20.49 | 326.8 | 260.6 | 193.4 | 158.7 | 99.44 | 75.9 | 75.9 | 20.49 | 20.49 | 20.49 | 75.9 | 75.9 | 99.44 | 158.7 | 193.4 | 260.6 | 326.8 | 20.49 | 99.44 | 193.4 |
| 22 | 299.5 | 193.4 | 99.44 | 21.53 | 348.2 | 286 | 226 | 193.4 | 164.9 | 158.7 | 99.44 | 99.44 | 99.44 | 158.7 | 164.9 | 193.4 | 226 | 286 | 348.2 | 21.53 | 99.44 | 193.4 | 299.5 |
| 23 | 15.74 | 299.5 | 193.4 | 158.7 | 75.9 | 15.74 | 326.8 | 286 | 260.6 | 226 | 226 | 226 | 226 | 226 | 260.6 | 286 | 326.8 | 15.74 | 75.9 | 158.7 | 193.4 | 299.5 | 15.74 |

FIG. 12A

| n \ m | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 1 | -1.688 | 9.441 | -16.48 | 21.45 | 3.533 | 0.157 | -0.3291 | -1.085 | 4.749 | -7.39 | 6.124 | 10.64 | 6.124 | -7.39 | 4.749 | -1.085 | -0.3291 | 0.157 | 3.533 | 21.45 | -16.48 | 9.441 | -1.688 |
| 2 | 9.441 | -7.978 | -20.55 | -24.7 | 7.838 | 3.373 | -7.39 | 0.6281 | 3.929 | 20.55 | -24.92 | -20.33 | -24.92 | 20.55 | 3.929 | 0.6281 | -7.39 | 3.373 | 7.838 | -24.7 | -20.55 | -7.978 | 9.441 |
| 3 | -16.48 | -20.55 | -17 | 4.099 | 4.749 | -3.902 | 11.41 | -6.544 | 2.226 | 25.42 | -16.02 | -11.36 | -16.02 | 25.42 | 2.226 | -6.544 | 11.41 | -3.902 | 4.749 | 4.099 | -17 | -20.55 | -16.48 |
| 4 | 21.45 | -24.7 | 4.099 | 0.6588 | -1.961 | -20.33 | 6.858 | -11.44 | -6.206 | -4.101 | -4.421 | 0.3104 | -4.421 | -4.101 | -6.206 | -11.44 | 6.858 | -20.33 | -1.961 | 0.6588 | 4.099 | -24.7 | 21.45 |
| 5 | 3.533 | 7.838 | 4.749 | -1.961 | -11.14 | 25.42 | -10.9 | -4.421 | 2.548 | 0.9445 | 2.244 | 7.039 | 2.244 | 0.9445 | 2.548 | -4.421 | -10.9 | 25.42 | -11.14 | -1.961 | 4.749 | 7.838 | 3.533 |
| 6 | 0.157 | 3.373 | -3.902 | -20.33 | 25.42 | -1.507 | 1.72 | 5.727 | 4.732 | -3.76 | 3.46 | -0.5781 | 3.46 | -3.76 | 4.732 | 5.727 | 1.72 | -1.507 | 25.42 | -20.33 | -3.902 | 3.373 | 0.157 |
| 7 | -0.3291 | -7.39 | 11.41 | 6.858 | -10.9 | 1.72 | 2.244 | -8.594 | -3.17 | 14.99 | -29.55 | -24.65 | -29.55 | 14.99 | -3.17 | -8.594 | 2.244 | 1.72 | -10.9 | 6.858 | 11.41 | -7.39 | -0.3291 |
| 8 | -1.085 | 0.6281 | -6.544 | -11.44 | -4.421 | 5.727 | -8.594 | 0.3553 | -24.65 | -3.077 | 11.73 | -3.859 | 11.73 | -3.077 | -24.65 | 0.3553 | -8.594 | 5.727 | -4.421 | -11.44 | -6.544 | 0.6281 | -1.085 |
| 9 | 4.749 | 3.929 | 2.226 | -6.206 | 2.548 | 4.732 | -3.17 | -24.65 | 6.788 | 11 | -28.46 | -23.49 | -28.46 | 11 | 6.788 | -24.65 | -3.17 | 4.732 | 2.548 | -6.206 | 2.226 | 3.929 | 4.749 |
| 10 | -7.39 | 20.55 | 25.42 | -4.101 | 0.9445 | -3.76 | 14.99 | -3.077 | 11 | -18.5 | -9.318 | -4.316 | -9.318 | -18.5 | 11 | -3.077 | 14.99 | -3.76 | 0.9445 | -4.101 | 25.42 | 20.55 | -7.39 |
| 11 | 6.124 | -24.92 | -16.02 | -4.421 | 2.244 | 3.46 | -29.55 | 11.73 | -28.46 | -9.318 | 3.812 | -4.272 | 3.812 | -9.318 | -28.46 | 11.73 | -29.55 | 3.46 | 2.244 | -4.421 | -16.02 | -24.92 | 6.124 |
| 12 | 10.64 | -20.33 | -11.36 | 0.3104 | 7.039 | -0.5781 | -24.65 | -3.859 | -23.49 | -4.316 | -4.272 | 0.75 | -4.272 | -4.316 | -23.49 | -3.859 | -24.65 | -0.5781 | 7.039 | 0.3104 | -11.36 | -20.33 | 10.64 |
| 13 | 6.124 | -24.92 | -16.02 | -4.421 | 2.244 | 3.46 | -29.55 | 11.73 | -28.46 | -9.318 | 3.812 | -4.272 | 3.812 | -9.318 | -28.46 | 11.73 | -29.55 | 3.46 | 2.244 | -4.421 | -16.02 | -24.92 | 6.124 |
| 14 | -7.39 | 20.55 | 25.42 | -4.101 | 0.9445 | -3.76 | 14.99 | -3.077 | 11 | -18.5 | -9.318 | -4.316 | -9.318 | -18.5 | 11 | -3.077 | 14.99 | -3.76 | 0.9445 | -4.101 | 25.42 | 20.55 | -7.39 |
| 15 | 4.749 | 3.929 | 2.226 | -6.206 | 2.548 | 4.732 | -3.17 | -24.65 | 6.788 | 11 | -28.46 | -23.49 | -28.46 | 11 | 6.788 | -24.65 | -3.17 | 4.732 | 2.548 | -6.206 | 2.226 | 3.929 | 4.749 |
| 16 | -1.085 | 0.6281 | -6.544 | -11.44 | -4.421 | 5.727 | -8.594 | 0.3553 | -24.65 | -3.077 | 11.73 | -3.859 | 11.73 | -3.077 | -24.65 | 0.3553 | -8.594 | 5.727 | -4.421 | -11.44 | -6.544 | 0.6281 | -1.085 |
| 17 | -0.3291 | -7.39 | 11.41 | 6.858 | -10.9 | 1.72 | 2.244 | -8.594 | -3.17 | 14.99 | -29.55 | -24.65 | -29.55 | 14.99 | -3.17 | -8.594 | 2.244 | 1.72 | -10.9 | 6.858 | 11.41 | -7.39 | -0.3291 |
| 18 | 0.157 | 3.373 | -3.902 | -20.33 | 25.42 | -1.507 | 1.72 | 5.727 | 4.732 | -3.76 | 3.46 | -0.5781 | 3.46 | -3.76 | 4.732 | 5.727 | 1.72 | -1.507 | 25.42 | -20.33 | -3.902 | 3.373 | 0.157 |
| 19 | 3.533 | 7.838 | 4.749 | -1.961 | -11.14 | 25.42 | -10.9 | -4.421 | 2.548 | 0.9445 | 2.244 | 7.039 | 2.244 | 0.9445 | 2.548 | -4.421 | -10.9 | 25.42 | -11.14 | -1.961 | 4.749 | 7.838 | 3.533 |
| 20 | 21.45 | -24.7 | 4.099 | 0.6588 | -1.961 | -20.33 | 6.858 | -11.44 | -6.206 | -4.101 | -4.421 | 0.3104 | -4.421 | -4.101 | -6.206 | -11.44 | 6.858 | -20.33 | -1.961 | 0.6588 | 4.099 | -24.7 | 21.45 |
| 21 | -16.48 | -20.55 | -17 | 4.099 | 4.749 | -3.902 | 11.41 | -6.544 | 2.226 | 25.42 | -16.02 | -11.36 | -16.02 | 25.42 | 2.226 | -6.544 | 11.41 | -3.902 | 4.749 | 4.099 | -17 | -20.55 | -16.48 |
| 22 | 9.441 | -7.978 | -20.55 | -24.7 | 7.838 | 3.373 | -7.39 | 0.6281 | 3.929 | 20.55 | -24.92 | -20.33 | -24.92 | 20.55 | 3.929 | 0.6281 | -7.39 | 3.373 | 7.838 | -24.7 | -20.55 | -7.978 | 9.441 |
| 23 | -1.688 | 9.441 | -16.48 | 21.45 | 3.533 | 0.157 | -0.3291 | -1.085 | 4.749 | -7.39 | 6.124 | 10.64 | 6.124 | -7.39 | 4.749 | -1.085 | -0.3291 | 0.157 | 3.533 | 21.45 | -16.48 | 9.441 | -1.688 |

FIG. 13

100

200

| n \ m | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 1 | -2.33 | -1.64 | -1.44 | -1.3 | -3.25 | -2.33 | -1.13 | -2.13 | -1.63 | -1.97 | -1.97 | -1.97 | -1.97 | -1.97 | -1.63 | -2.13 | -1.13 | -2.33 | -3.25 | -1.3 | -1.44 | -1.64 | -2.33 |
| 2 | -1.64 | -1.44 | -2.4 | -2.37 | -1.06 | -2.13 | -1.97 | -1.44 | -2.16 | -1.3 | -2.4 | -2.4 | -2.4 | -1.3 | -2.16 | -1.44 | -1.97 | -2.13 | -1.06 | -2.37 | -2.4 | -1.44 | -1.64 |
| 3 | -1.44 | -2.4 | -2.1 | -1.13 | -1.63 | -1.44 | -1.3 | -2.4 | -3.25 | -3.25 | -2.1 | -2.1 | -2.1 | -3.25 | -3.25 | -2.4 | -1.3 | -1.44 | -1.63 | -1.13 | -2.1 | -2.4 | -1.44 |
| 4 | -1.3 | -2.37 | -1.13 | -1.35 | -2.01 | -2.4 | -3.25 | -2.33 | -1.06 | -1.13 | -1.63 | -1.63 | -1.63 | -1.13 | -1.06 | -2.33 | -3.25 | -2.4 | -2.01 | -1.35 | -1.13 | -2.37 | -1.3 |
| 5 | -3.25 | -1.06 | -1.63 | -2.01 | -2.4 | -3.25 | -1.06 | -1.63 | -2.13 | -1.63 | -1.35 | -1.35 | -1.35 | -1.63 | -2.13 | -1.63 | -1.06 | -3.25 | -2.4 | -2.01 | -1.63 | -1.06 | -3.25 |
| 6 | -2.33 | -2.13 | -1.44 | -2.4 | -3.25 | -1.06 | -1.64 | -1.63 | -1.97 | -1.44 | -1.22 | -2.01 | -1.22 | -1.44 | -1.97 | -1.63 | -1.64 | -1.06 | -3.25 | -2.4 | -1.44 | -2.13 | -2.33 |
| 7 | -1.13 | -1.97 | -1.3 | -3.25 | -1.06 | -1.64 | -1.35 | -1.44 | -2.16 | -1.3 | -2.4 | -2.4 | -2.4 | -1.3 | -2.16 | -1.44 | -1.35 | -1.64 | -1.06 | -3.25 | -1.3 | -1.97 | -1.13 |
| 8 | -2.13 | -1.44 | -2.4 | -2.33 | -1.63 | -1.63 | -1.44 | -1.3 | -2.4 | -3.17 | -3.17 | -3.25 | -3.17 | -3.17 | -2.4 | -1.3 | -1.44 | -1.63 | -1.63 | -2.33 | -2.4 | -1.44 | -2.13 |
| 9 | -1.63 | -2.16 | -3.25 | -1.06 | -2.13 | -1.97 | -2.16 | -2.4 | -3.17 | -3.25 | -2.37 | -2.37 | -2.37 | -3.25 | -3.17 | -2.4 | -2.16 | -1.97 | -2.13 | -1.06 | -3.25 | -2.16 | -1.63 |
| 10 | -1.97 | -1.3 | -3.25 | -1.13 | -1.63 | -1.44 | -1.3 | -3.17 | -3.25 | -2.37 | -2.33 | -2.33 | -2.33 | -2.37 | -3.25 | -3.17 | -1.3 | -1.44 | -1.63 | -1.13 | -3.25 | -1.3 | -1.97 |
| 11 | -1.97 | -2.4 | -2.1 | -1.63 | -1.35 | -1.22 | -2.4 | -3.17 | -2.37 | -2.33 | -2.66 | -1.895 | -2.66 | -2.33 | -2.37 | -3.17 | -2.4 | -1.22 | -1.35 | -1.63 | -2.1 | -2.4 | -1.97 |
| 12 | -1.97 | -2.4 | -2.1 | -1.63 | -1.35 | -2.01 | -2.4 | -3.25 | -2.37 | -2.33 | -1.895 | -1.895 | -1.895 | -2.33 | -2.37 | -3.25 | -2.4 | -2.01 | -1.35 | -1.63 | -2.1 | -2.4 | -1.97 |
| 13 | -1.97 | -2.4 | -2.1 | -1.63 | -1.35 | -1.22 | -2.4 | -3.17 | -2.37 | -2.33 | -2.66 | -1.895 | -2.66 | -2.33 | -2.37 | -3.17 | -2.4 | -1.22 | -1.35 | -1.63 | -2.1 | -2.4 | -1.97 |
| 14 | -1.97 | -1.3 | -3.25 | -1.13 | -1.63 | -1.44 | -1.3 | -3.17 | -3.25 | -2.37 | -2.33 | -2.33 | -2.33 | -2.37 | -3.25 | -3.17 | -1.3 | -1.44 | -1.63 | -1.13 | -3.25 | -1.3 | -1.97 |
| 15 | -1.63 | -2.16 | -3.25 | -1.06 | -2.13 | -1.97 | -2.16 | -2.4 | -3.17 | -3.25 | -2.37 | -2.37 | -2.37 | -3.25 | -3.17 | -2.4 | -2.16 | -1.97 | -2.13 | -1.06 | -3.25 | -2.16 | -1.63 |
| 16 | -2.13 | -1.44 | -2.4 | -2.33 | -1.63 | -1.63 | -1.44 | -1.3 | -2.4 | -3.17 | -3.17 | -3.25 | -3.17 | -3.17 | -2.4 | -1.3 | -1.44 | -1.63 | -1.63 | -2.33 | -2.4 | -1.44 | -2.13 |
| 17 | -1.13 | -1.97 | -1.3 | -3.25 | -1.06 | -1.64 | -1.35 | -1.44 | -2.16 | -1.3 | -2.4 | -2.4 | -2.4 | -1.3 | -2.16 | -1.44 | -1.35 | -1.64 | -1.06 | -3.25 | -1.3 | -1.97 | -1.13 |
| 18 | -2.33 | -2.13 | -1.44 | -2.4 | -3.25 | -1.06 | -1.64 | -1.63 | -1.97 | -1.44 | -1.22 | -2.01 | -1.22 | -1.44 | -1.97 | -1.63 | -1.64 | -1.06 | -3.25 | -2.4 | -1.44 | -2.13 | -2.33 |
| 19 | -3.25 | -1.06 | -1.63 | -2.01 | -2.4 | -3.25 | -1.06 | -1.63 | -2.13 | -1.63 | -1.35 | -1.35 | -1.35 | -1.63 | -2.13 | -1.63 | -1.06 | -3.25 | -2.4 | -2.01 | -1.63 | -1.06 | -3.25 |
| 20 | -1.3 | -2.37 | -1.13 | -1.35 | -2.01 | -2.4 | -3.25 | -2.33 | -1.06 | -1.13 | -1.63 | -1.63 | -1.63 | -1.13 | -1.06 | -2.33 | -3.25 | -2.4 | -2.01 | -1.35 | -1.13 | -2.37 | -1.3 |
| 21 | -1.44 | -2.4 | -2.1 | -1.13 | -1.63 | -1.44 | -1.3 | -2.4 | -3.25 | -3.25 | -2.1 | -2.1 | -2.1 | -3.25 | -3.25 | -2.4 | -1.3 | -1.44 | -1.63 | -1.13 | -2.1 | -2.4 | -1.44 |
| 22 | -1.64 | -1.44 | -2.4 | -2.37 | -1.06 | -2.13 | -1.97 | -1.44 | -2.16 | -1.3 | -2.4 | -2.4 | -2.4 | -1.3 | -2.16 | -1.44 | -1.97 | -2.13 | -1.06 | -2.37 | -2.4 | -1.44 | -1.64 |
| 23 | -2.33 | -1.64 | -1.44 | -1.3 | -3.25 | -2.33 | -1.13 | -2.13 | -1.63 | -1.97 | -1.97 | -1.97 | -1.97 | -1.97 | -1.63 | -2.13 | -1.13 | -2.33 | -3.25 | -1.3 | -1.44 | -1.64 | -2.33 |

FIG. 14

HUYGENS LENS FOR HIGHER ANTENNA GAIN

CROSS-REFERENCE TO RELATED APPLICATIONS

The present application claims priority to and is a national stage application of PCT/SG2022/050690 filed Sep. 27, 2022 which claims priority to SG10202110750T filed Sep. 28, 2021, each of which is herein incorporated by reference in its entirety.

The present application claims priority to the Singapore patent application no. 10202110750T which is incorporated in its entirety by reference.

TECHNICAL FIELD

The present disclosure relates to the field of electromagnetic transmission, and more particularly to a Huygens lens for an antenna.

BACKGROUND

Dielectric lenses or planar lenses may be employed to increase the gain of antenna. Owing to limitations in precision manufacturability and other factors, most planar lenses are limited to operating in frequency ranges in the microwave range or in the K band of the electromagnetic spectrum.

SUMMARY

A Huygens lens, comprising: a substrate of a dielectric material, the substrate having a first substrate surface and a second substrate surface, the second substrate surface opposing the first substrate surface; first conductive elements disposed on the first substrate surface; and second conductive elements disposed on the second substrate surface, the second conductive elements being electrically insulated from the first conductive elements by the substrate, wherein the first conductive elements and the second conductive elements form an array of a plurality of unit cells, the array having a concentric phase distribution, each of the plurality of unit cells being operable within a range of frequencies, the range of frequencies including at least a part of a W-band of an electromagnetic spectrum.

The first conductive elements and the second conductive elements may comprise a plurality of metallic strips. The plurality of metallic strips may comprise: a first pair of metallic strips disposed on the first substrate surface and the second surface respectively, each of the first pair of metallic strips wholly extending along a first straight axis in a first orientation; a second pair of metallic strips disposed on the first substrate surface and the second substrate surface respectively, each of the second pair of metallic strips wholly extending along a second straight axis in the first orientation; a third pair of metallic strips disposed on the first substrate surface and the second substrate surface respectively, each of the third pair of metallic strips wholly extending along a third straight axis in a second orientation, the second orientation being orthogonal to the first orientation; and a fourth pair of metallic strips disposed on the first substrate surface and the second substrate surface respectively, each of the fourth pair of metallic strips wholly extending along a fourth straight axis in the second orientation, wherein each of the plurality of metallic strips is spaced apart from any other of the plurality of metallic strips.

The first conductive elements and the second conductive elements may be aligned along a normal axis such that the respective footprints of the first conductive elements and the second conductive elements coincide, wherein the normal axis is a normal of the first substrate surface and the second substrate surface.

For each of the plurality of unit cells, the first conductive elements and the second conductive elements may define respective sides of a quadrilateral functional region, wherein the quadrilateral functional region is devoid of any metallic material, and wherein the first conductive elements and the second conductive elements do not extend to each corner of the quadrilateral functional region. The quadrilateral functional region may be characterized by a dimension of $(p-1)\times(p-1)$, and wherein p ranges from 2.0 mm to 2.4 mm inclusive. The first conductive elements and the second conductive elements may be disposed such that the each of the plurality of unit cells is characterized by reflective symmetry about a diagonal plane of the unit cell. Each of the plurality of unit cells is operable in each of a reference orientation and a rotated orientation, wherein the rotated orientation is rotationally displaced relative to the reference orientation about a respective geometric center.

The Huygens lens is operable in a dual polarized mode and a single polarized mode, wherein the Huygens lens in the dual polarized mode is configured to concurrently operate in a x-direction polarization and a y-direction polarization, and wherein the Huygens lens in the single polarized mode is configured to operate in no more than one of the x-direction polarization and the y-direction polarization. Each of the plurality of unit cells may be configured with a phase value determined by dimensions of the first conductive elements and the second conductive elements. The array may comprise multiple unit cells with respective phase values in each of a plurality of bands of phases, the plurality of bands of phases including phase values ranging from 0 degree to near-360 degrees. The array may be configured to be operable in a region of the electromagnetic spectrum, and wherein the region overlaps with at least a portion of the W-band of the electromagnetic spectrum. The first conductive elements and the second conductive elements may be dimensioned such that the Huygens lens is operable in the W-band of the electromagnetic spectrum. Each of the plurality of unit cells may be characterized by a transmission amplitude of greater than −3.25 dB.

The first pair of metallic strips and the third pair of metallic strips may be characterized by a first width, and wherein the second pair of metallic strips and the fourth pair of metallic strips may be characterized by a second width, and wherein the second width is equal to or greater than the first width. The first pair of metallic strips and the third pair of metallic strips may be characterized by a first length, and wherein the second pair of metallic strips and the fourth pair of metallic strips may be characterized by a second length.

At least one of the first pair of metallic strips and the third pair of metallic strip may comprise: one rectangular metallic strip disposed on the second substrate surface; and two rectangular metallic strips disposed on the first substrate surface, the two rectangular metallic strips being axially aligned, and wherein respective ends of the two rectangular metallic strips define a gap therebetween.

The gap may range from 0 mm to 0.3 mm inclusive, the first width may be 0.1 mm, the second width may range from 0.1 mm to 0.2 mm inclusive, the first length may range from 0.6 mm to 1.4 mm inclusive, the second length may range from 0.05 to 1.2 inclusive, and p may range from 1.8 to 2.4, $p_1$ may be a constant value of 2.4 mm, $p_1$ being a periodicity of the array.

In another aspect, the present application discloses an antenna system comprising: the Huygens lens according to any of the above; and an antenna disposed at a focal point of the Huygens lens, the Huygens lens being configured to increase a gain of the antenna in a dual polarization mode. The Huygens lens may be operable at a frequency ranging from 75 GHz to 80 GHz. The Huygens lens may comprise a 23×23 array of the plurality of unit cells, in which each of the plurality of unit cells defines an area of 2.4 mm×2.4 mm.

BRIEF DESCRIPTION OF DRAWINGS

FIGS. 3A and 3B show theoretically calculated phase distribution of a Huygens lens;

FIGS. 12A and 12B shows the phase distribution of a Huygens lens according to Table 1;

FIG. 13 shows the phase difference of respective unit cells of the Huygens lens of FIG. 12A and the theoretically calculated phase distribution of FIG. 3A;

FIG. 14 shows the transmission amplitude for respective unit cells of the Huygens lens of FIG. 12A;

DETAILED DESCRIPTION

Figure 1:
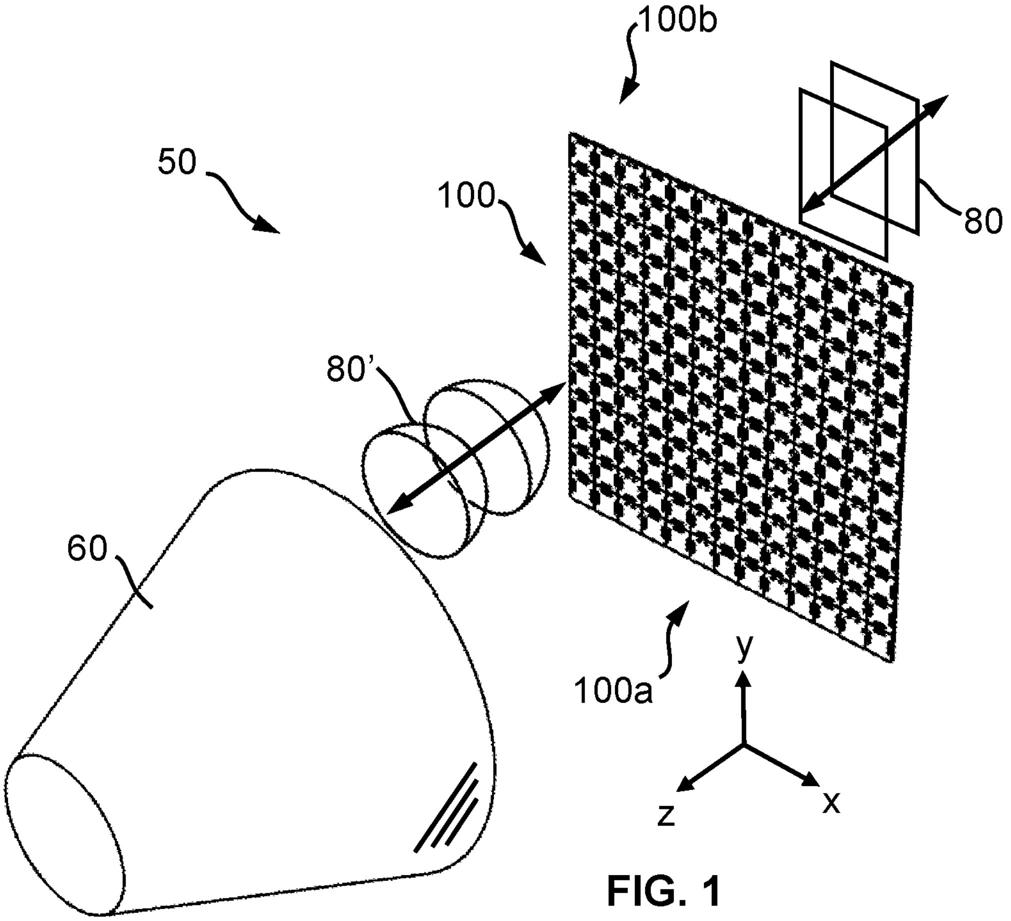
FIG. 1 is a perspective view of an antenna system according to an embodiment of the present disclosure.

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment. Furthermore, the described features, structures, or characteristics may be combined in any suitable manner in one or more embodiments. In the following description, numerous specific details are provided to give a thorough understanding of embodiments. One skilled in the relevant art will recognize that the various embodiments may be practiced without one or more of the specific details, or with other methods, components, materials, etc. In other instances, some or all known structures, materials, or operations may not be shown or described in detail to avoid obfuscation.

The word "exemplary" is used herein to mean "serving as an example, instance, or illustration." Any embodiment described herein as "exemplary" is not necessarily to be construed as preferred or advantageous over other embodiments. As used herein, the singular 'a' and 'an' may be construed as including the plural "one or more" unless apparent from the context to be otherwise.

Terms such as "first" and "second" are used in the description and claims only for the sake of brevity and clarity, and do not necessarily imply a priority or order, unless required by the context. The terms "about" and "approximately" as applied to a stated numeric value encompasses the exact value and a reasonable variance as will be understood by one of ordinary skill in the art, and the terms "generally" and "substantially" are to be understood in a similar manner, unless otherwise specified. In the present disclosure, reference to a range of values includes the lowest value and the highest value of the range.

In the present disclosure, the terms "metalens", "meta surface", "Huygen surface", "Huygen lens", "metalens array", and "array of metalens" may be used interchangeably. The term "W-band electromagnetic spectrum" or "W-band" broadly refers to (but is not limited to) a frequency or frequencies in the electromagnetic spectrum in a range from about 75 GHz (gigahertz) to about 110 GHz. In some instances, the term "W-band electromagnetic spectrum" or "W-band" may more specifically refer to one or more frequencies or frequency ranges in a range from about 75 GHz to about 80 GHz inclusive.

The terms "align", "aligning", "aligned", and "in alignment" as used herein with reference to two objects, such as two metallic strips, may generally refer to respective peripheries of the two metallic strips being in line along a specific direction. The term "orientation" may generally refer to a direction of an object, such as a metallic strip. The term "orientation" as used herein does not include the position or location, and hence two objects disposed in different positions or locations may have the same or similar orientation.

Disclosed herein is a Huygens lens 100 operable in the W-band electromagnetic spectrum, and antenna system 50 including the Huygens lens 100. The Huygens lens 100 is configured to improve the performance of an antenna 60, such as increasing or improving a gain of the antenna 60, in a range of electromagnetic frequencies including at least a part of the W-band electromagnetic spectrum. In some embodiments, the Huygens lens 100 is configured to be operable at one or more frequencies in the W-band electromagnetic spectrum. The Huygens lens 100 may be configured to be operable in a region of the electromagnetic spectrum in which the region overlaps with at least a portion of the W-band electromagnetic spectrum.

Figure 2A:
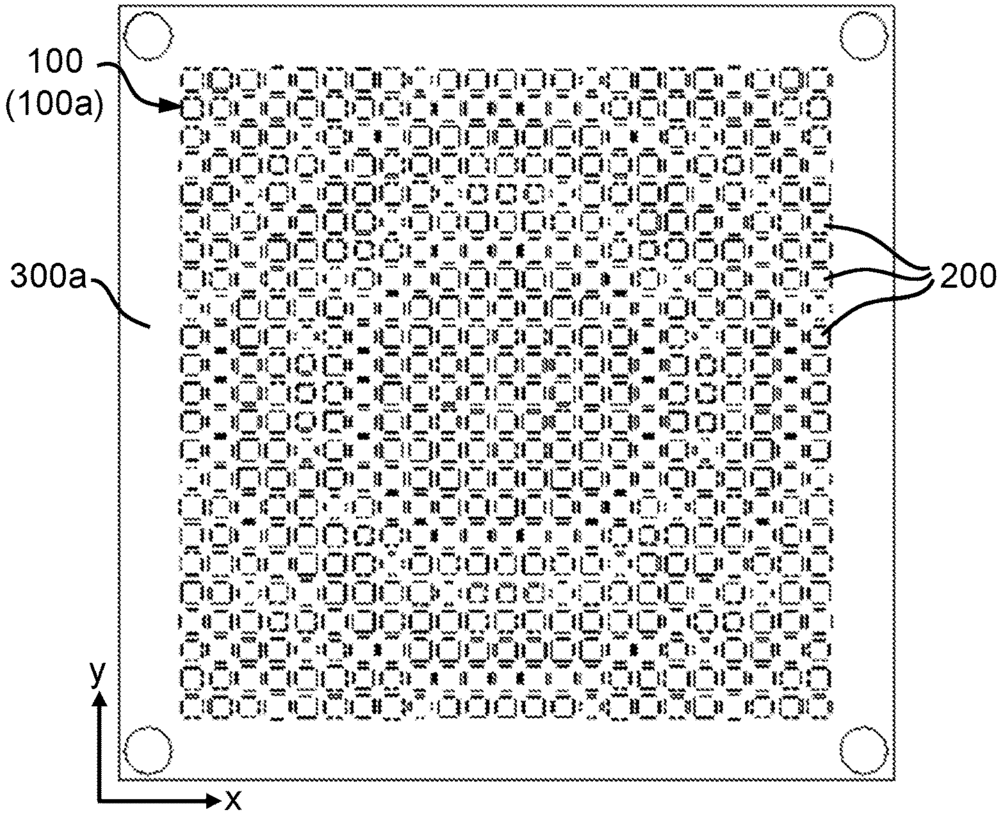
FIG. 2A is a front view of a Huygens lens according to an embodiment of the present disclosure.
Figure 2B:
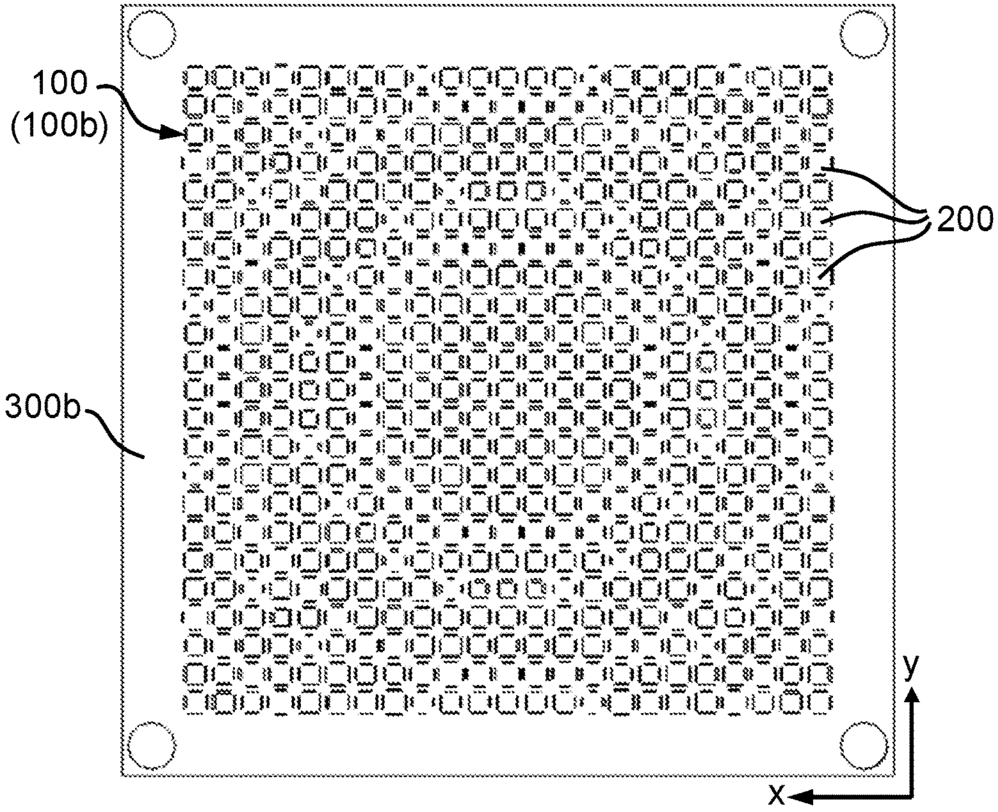
FIG. 2B is a rear view of the Huygens lens of FIG. 2A.

FIG. 1 schematically illustrates one embodiment of the antenna system 50 which emits the spherical waves 80' and these spherical waves 80' are converted to planar waves 80 by Huygens lens 100 so that the gain in the W band will be increased. The antenna system 50 includes the antenna 60, such as a horn antenna, and a Huygens lens 100 configured to amplify or increase the gain of the antenna 60. The Huygens lens 100 is preferably disposed spaced apart from the antenna 60 and with the respective focal points in substantial alignment along an axial direction. FIGS. 2A and 2B are images of a first array 100*a* of conductive elements and a second array 100*b* of conductive elements, each disposed on opposing substrate surfaces 300*a*,300*b* of the Huygens lens 100. The first array 100*a* of conductive elements may be disposed to face the antenna 60 (e.g., on the surface of FIG. 2A), and the second array of conductive elements 100*b* (e.g., on the surface of FIG. 2B) is disposed to face away from the antenna 60, in which the axial direction substantially coincides with a respective normal of the first substrate surface 300*a* and the second substrate surface 300*b*.

The Huygens lens 100 of the present disclosure may be described as two metallic layers spaced apart by a dielectric layer (also referred to as a substrate 300). The Huygens lens 100 may be described as a dielectric plate sandwiched by two metallic layers, in which each of the two metallic layers is configured as an array of conductive elements (also referred to as “metallic strips”). The Huygens lens 100 may be configured as a substantially flat piece of a dielectric material with metallic materials selectively printed or disposed on each of the opposing substrate surfaces 300*a*,300*b*. The overall shape of the entire Huygens lens 100 or the dielectric layer may be varied. In the non-limiting examples shown, the overall shape of the dielectric material may be quadrilateral, e.g., in the form of a rectangular plate or a square plate.

The Huygens lens 100 is configured as an array of unit cells 200, e.g., a plurality of unit cells 200 distributed in a pattern with a rotational symmetry. In some embodiments, the array is a M×N array configuration. In some embodiments, the Huygens lens 100 has a certain N number of unit cells 200 in a row in an x-direction and the same N number of unit cells in a row in a y-direction (orthogonal to the x-direction) such that the array is an N×N array configuration. For ease of reference and not to be limiting, any unit cell 200 in the Huygens lens may be referenced by its position in the array, e.g., unit cell indices m=4 and n=5 may be used to refer to the unit cell in a fourth column and a fifth row of the array of unit cells 200 from the center unit cell, as viewed from one of the Huygens lens surfaces. The array may also be characterized by a parameter $p_1$ corresponding to a periodicity of the plurality of unit cells in the array, e.g., corresponding to how far adjacent unit cells are spaced apart.

Each unit cell 200 defines a respective unit cell area on each of the first substrate surface 300*a* and the second substrate surface 300*b*, the unit cell areas being spaced apart by the dielectric material. In some embodiments, each unit cell 200 may be defined as a quadrilateral unit, e.g., a unit having a square unit cell surface on each of the first and second substrate surfaces 300*a*,300*b*. In a preferred embodiment, each unit cell 200 is defined in terms of a $p_1 \times p_1$ (square) unit cell surface on each of the substrate surfaces 300*a*/300*b*. In embodiments, each unit cell 200 may be disposed adjacent to at least one other unit cell 200 such that each unit cell 200 is equally distanced (or spaced apart) from each of its nearest neighboring unit cells (i.e., each of its two, three, or four nearest adjacent unit cells 200 sharing a common unit cell edge 304/306). It will be understood that the Huygens lens 100 is formed using a unitary or contiguous piece of substrate 300 and that the unit cell edges 304/306 are imaginary boundaries.

The Huygens lens 100 of the present disclosure includes a first array 100*a* of unit cells 200, in which each unit cell 200 includes conductive elements 303*a* on the first substrate surface 300*a*. The Huygens lens 100 also includes a corresponding second array 100*b* of unit cells 200, in which each unit cell 200 includes conductive elements 303*b* on the second substrate surface 300*b*. The first array 100*a* and the second array 100*b* provide a phase distribution similar to or in the manner of a theoretically calculated Huygens lens. In preferred embodiments, the conductive elements 303*a*,303*b* are configured such that the Huygens lens 100 is operable in the W-band of the electromagnetic spectrum. In other words, the Huygens lens 100 is operable as a mmWave Huygens lens for high gain. Each of the plurality of unit cells 200 in the Huygens lens 100 is configured with a phase shift according to the position of the unit cell 200 in the array such that the Huygens lens 100 (or the first array 100*a* and the second array 100*b*) collectively provides a phase distribution operable as a Huygens lens for improving the gain of an antenna 60.

Figure 3B:
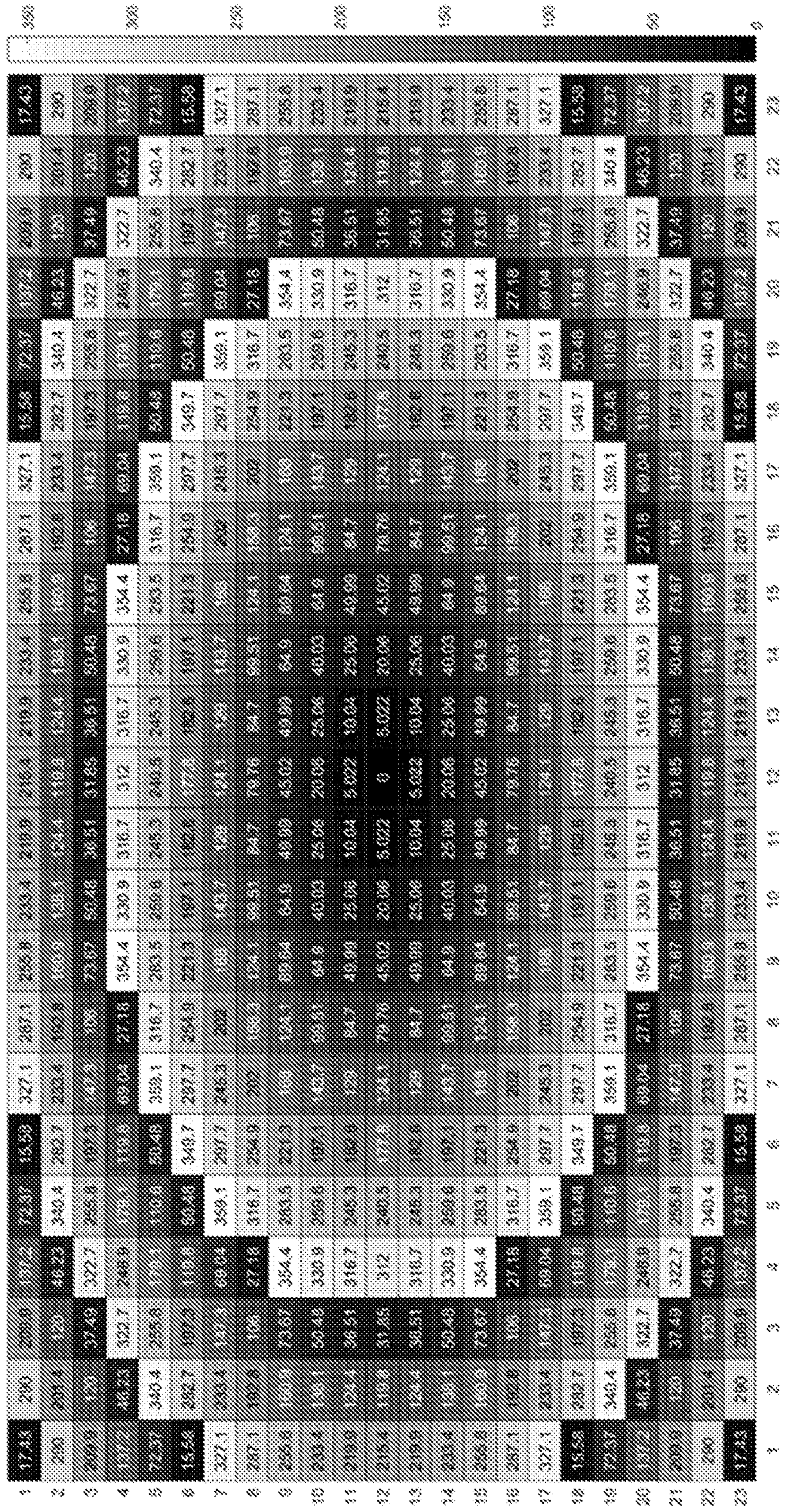

FIG. 3A shows a phase distribution of a Huygens lens 100 according to a preferred embodiment of the present disclosure. The Huygens lens 100 of FIG. 3A may be referred to as a Huygens lens with theoretically calculated phase distribution. FIG. 3B shows FIG. 3A with corresponding bands (ranges) of phases shaded differently to better illustrate the concentric distribution of the phases. As illustrated, the Huygens lens 100 of the present disclosure is characterized by a generally concentric phase distribution across the arrays 100*a*/100*b* of unit cells 200. The phase distribution across the Huygens lens 100 ranges from 0 to about 360 degrees (or near-360 degrees) such that the Huygens lens 100 is operable in the W-band of the electromagnetic spectrum. The phase shift may be determined with respect to a reference unit cell, such as the center unit cell for the sake of convenience. The phase shift for each unit cell 200 in the Huygens lens 100 may be represented by Equation (1) as follows:

$$\Delta\varphi = \frac{2\pi f_c}{C}\left(\sqrt{(mp_1)^2 + (np_1)^2 + F^2} - F\right) \tag{1}$$

where $\Delta\varphi$ is the phase shift, $f_c$ is the operating frequency, C is the speed of electromagnetic waves, m is the unit cell index along a row of the array, n is the unit cell index along a column of the array (the row and the column being interchangeable since the Huygens lens is characterized by rotational symmetry), $p_1$ is a linear dimension corresponding to the size of one unit cell, and F is the focal length of the Huygens lens.

In the non-limiting example of FIGS. 3A and 3B, with a focal length F=54 mm, and $p_1$=2.4 mm, the Huygens lens 100 of a 23×23 array is characterized by the operating frequency of $f_c$=78.5 GHz which is in the W-band of the electromagnetic spectrum. The phase distribution spans from 0 degree to near-360 degrees. In this example, the phase distributions across each of the first array 100*a* and the corresponding second array 100*b* range from 0 degree to 354.4 degrees, which is effectively 360 degrees or near-360 degrees for the purpose of serving as a Huygens lens. In the present disclosure, the term “near-360 degrees” refers to phase shifts of about 360 degrees or sufficiently close to 360 degrees. Examples of near-360 degrees include but are not limited to phase shifts of at least 348.2 degrees, or preferably at least 354.4 degrees.

In an exemplary 23×23 array (first array 100*a*/second array 100*b*), for convenience, the unit cells 200 may be optionally configured in about 21 incremental bands of phases to facilitate manufacturing. It has also been experimentally verified that the Huygens lens 100 of the present disclosure is operable as a Huygens lens in the W-band with a tolerance of +30 degrees (in the phase of each unit cell 200). Such manufacturing considerations are relevant in this field where practical constraints have prevented actual implementation of various theoretically appealing but impractical ideas.

Reference will now be made to FIGS. 4 to 7 to describe embodiments of the present disclosure at the level of the unit cell 200. The unit cell 200 of the present disclosure includes first conductive elements 303*a* disposed in a first pattern/configuration on the first substrate surface 300*a* of the unit cell 200. The unit cell 200 of the present disclosure includes second conductive elements 303*b* disposed in a second pattern/configuration 303*b* on the second substrate surface 300*b* of the unit cell 200. Each of the first conductive elements 303*a* and the second conductive elements 303*b* may include at least one metallic strip. In some examples, the metallic strips may have a thickness of 0.017 mm. All of the unit cells 200 in a Huygens lens 100 of the present disclosure may be described as having a similar geometric configuration for the first metallic configuration 303*a* and the second metallic configuration 303*b*, but with the parameters of the geometric configuration varied for different unit cells 200. That is, various unit cells 200 of the same Huygens lens 100 may be characterized by different parameters for the first/second conductive elements such that the unit cells 200 are associated with different phase shifts.

Figure 4:
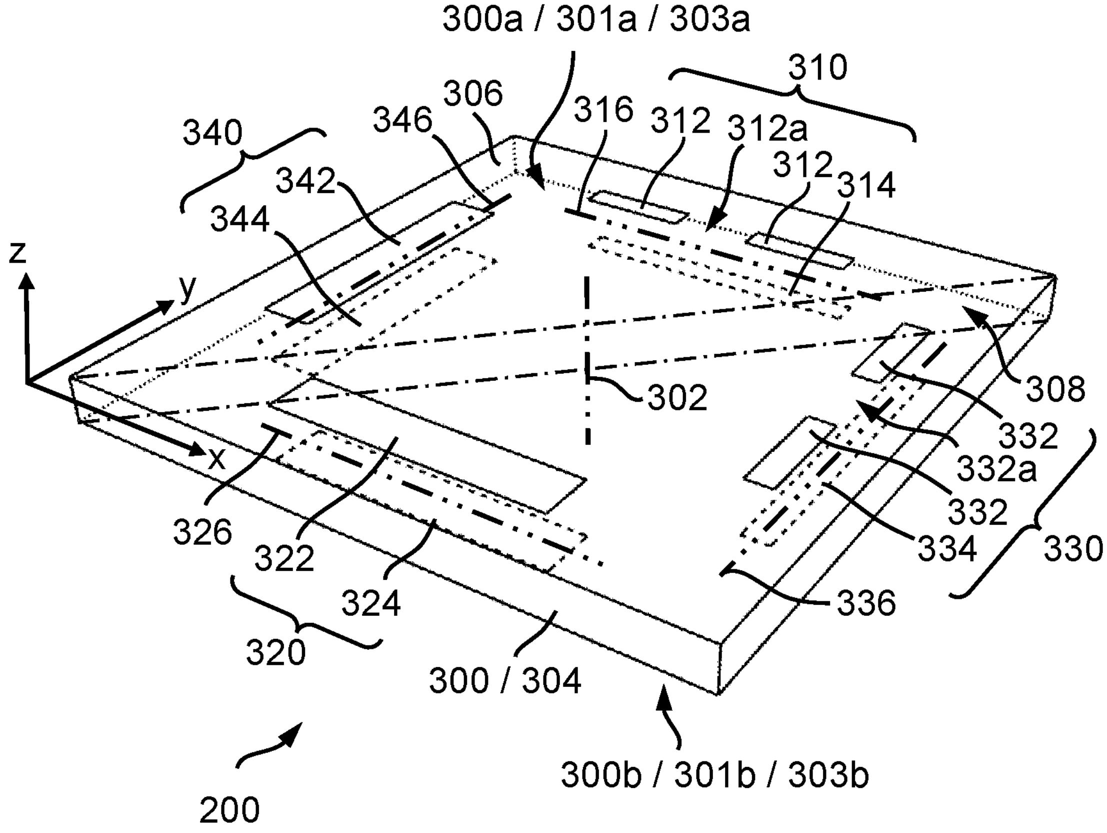
FIG. 4 is a perspective view of a unit cell of a Huygens lens of FIG. 2A.
Figure 7:
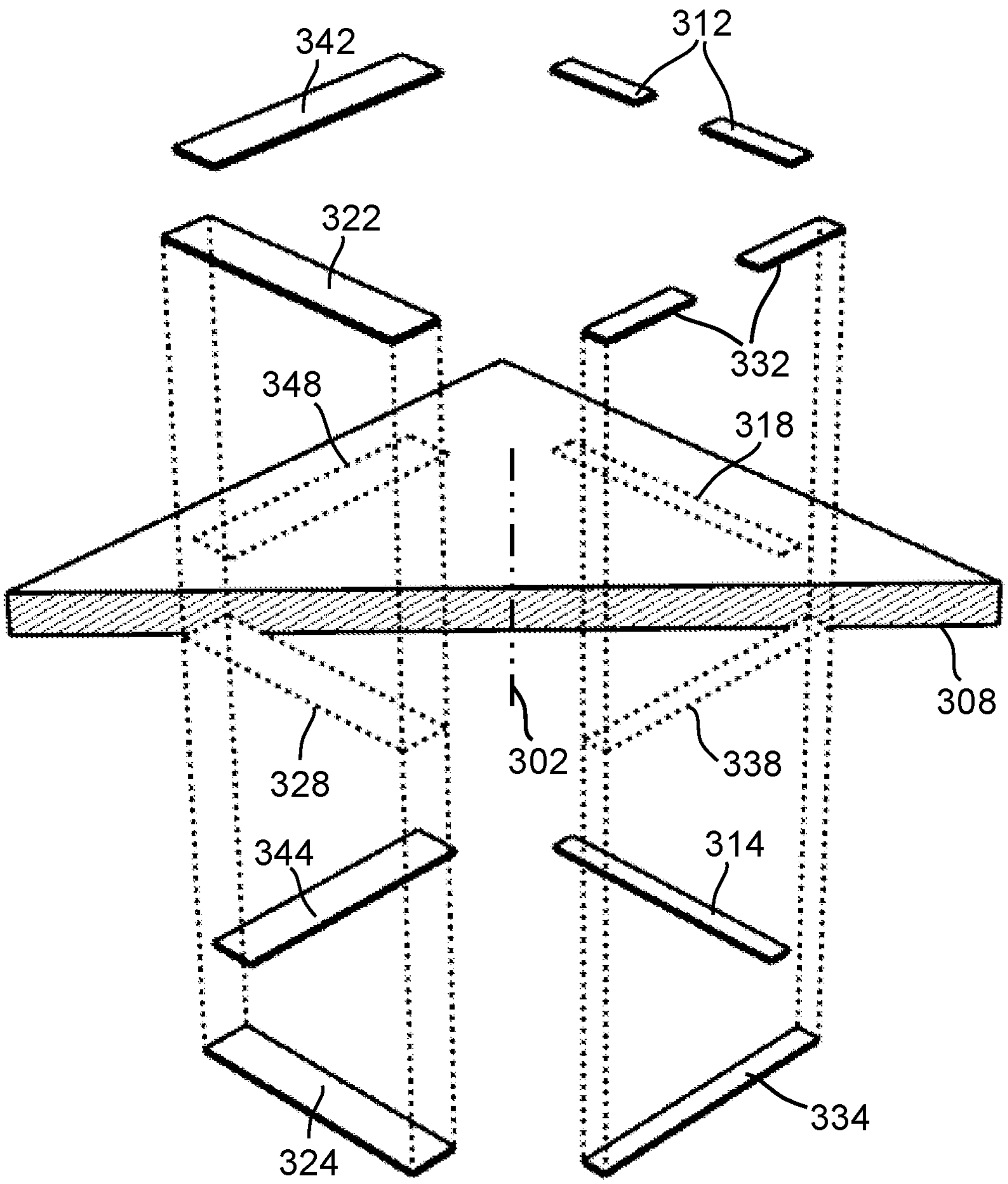
FIG. 7 is a partial cross-sectional exploded view of the unit cell of FIG. 5.
Figure 8:
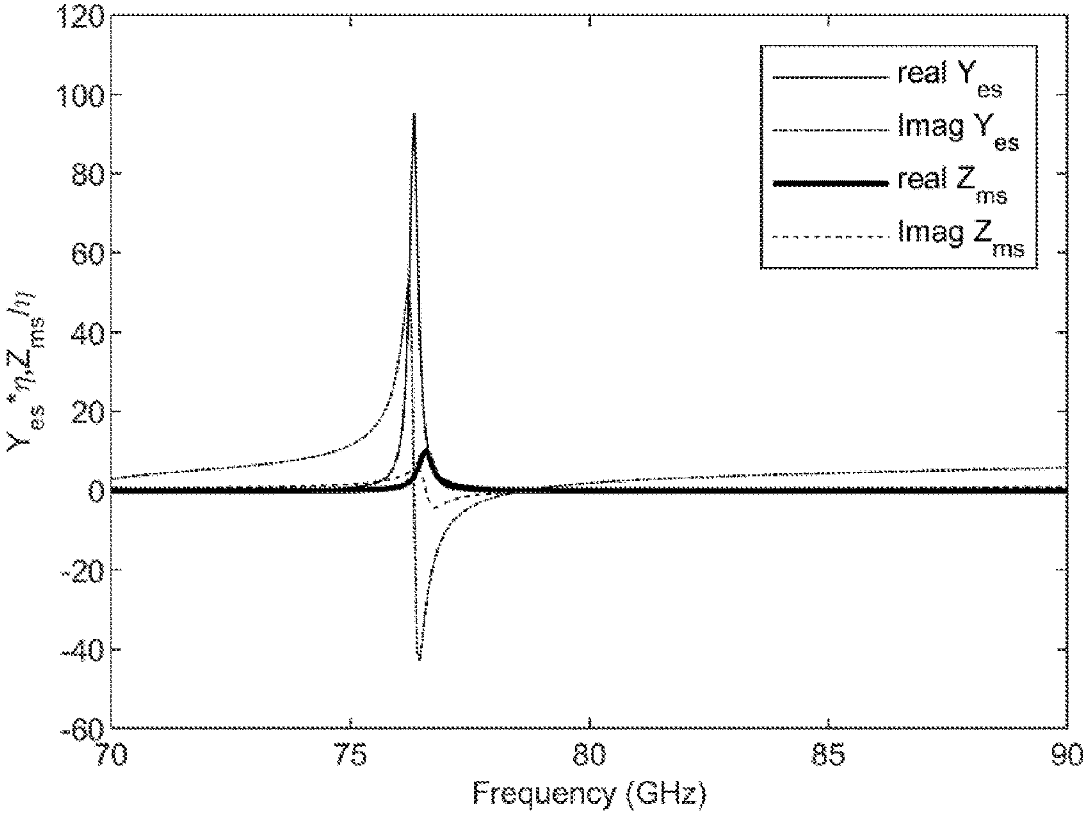
FIG. 8 shows simulated normalized electric admittance and normalized magnetic admittance responses for an exemplary unit cell according to one embodiment of the present disclosure.

FIG. 4 is a perspective view of an exemplary unit cell 200 of the present disclosure. The first conductive elements 303*a* disposed on the first substrate surface 300*a* includes metallic strips 312/322/332/342 shown in solid lines. The second metallic configuration or second conductive elements 303*b* disposed on the second substrate surface 300*b* includes metallic strips 314/324/334/344 shown in dotted lines. The second conductive elements 303*b* are electrically insulated from the first conductive elements 303*a* by the substrate 300. The unit cell 200 is characterized by a reflective symmetry about a diagonal plane 308, in which the diagonal plane 308 extends from a corner of the unit cell 200 to an opposing corner of the unit cell 200. As shown in FIGS. 4 and 7, diagonal corners of the substrate 300 may define a diagonal plane 308.

The metallic strips are provided in pairs and configured to be operable as dipoles. A first pair 310 of the metallic strips include metallic strips 312/314. A second pair 320 of the metallic strips include metallic strips 322/324. A third pair 330 of the metallic strips include metallic strips 332/334. A fourth pair 340 of the metallic strips include metallic strips 342/344. The first pair 310 of the metallic strips may be configured as an electric dipole, and the similarly oriented second pair 320 of the metallic strips may be configured as a magnetic dipole. In some of the plurality of unit cells 200 in the Huygens lens 100, one or both of the first pair 310 of metallic strips and the third pair 330 of metallic strips includes two rectangular metallic strips 312/332 disposed on the first substrate surface 300*a* with a gap 312*a*/332*a* between respective ends of the two rectangular metallic strips 312/332, and one rectangular metallic strip disposed on the second substrate surface 300*b*.

Figure 5:
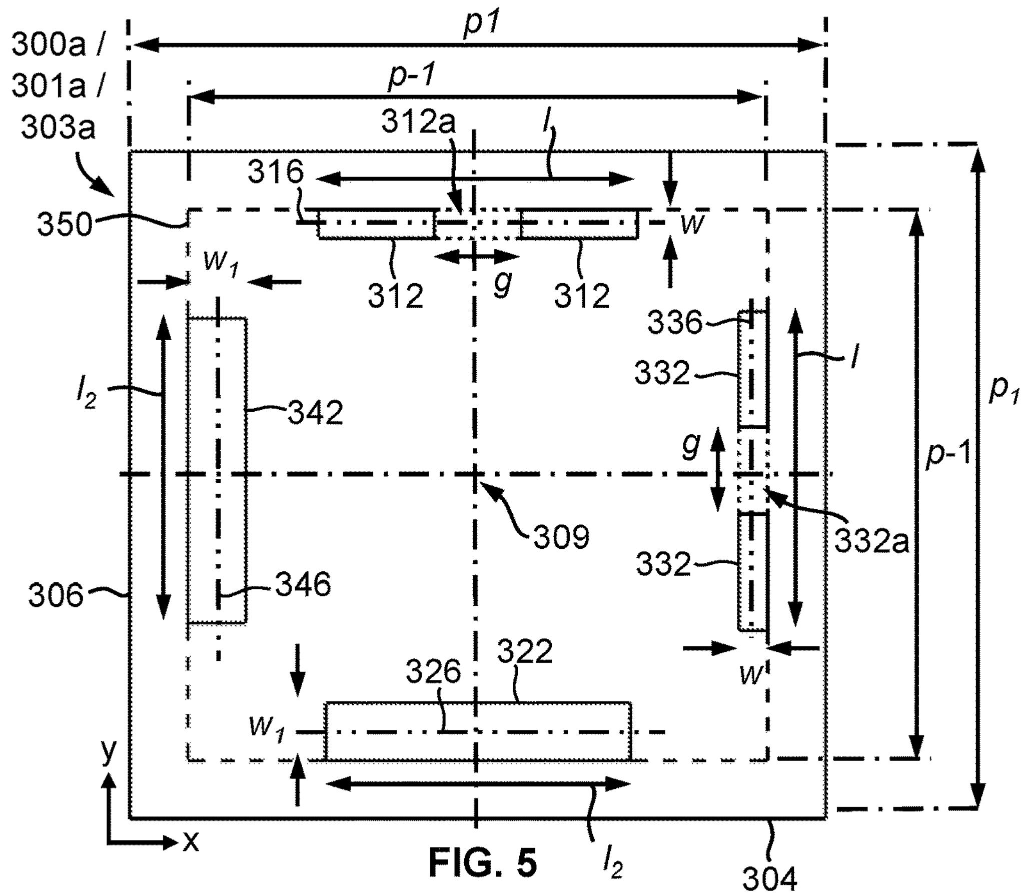
FIG. 5 is a front view of the unit cell of FIG. 4.
Figure 6:
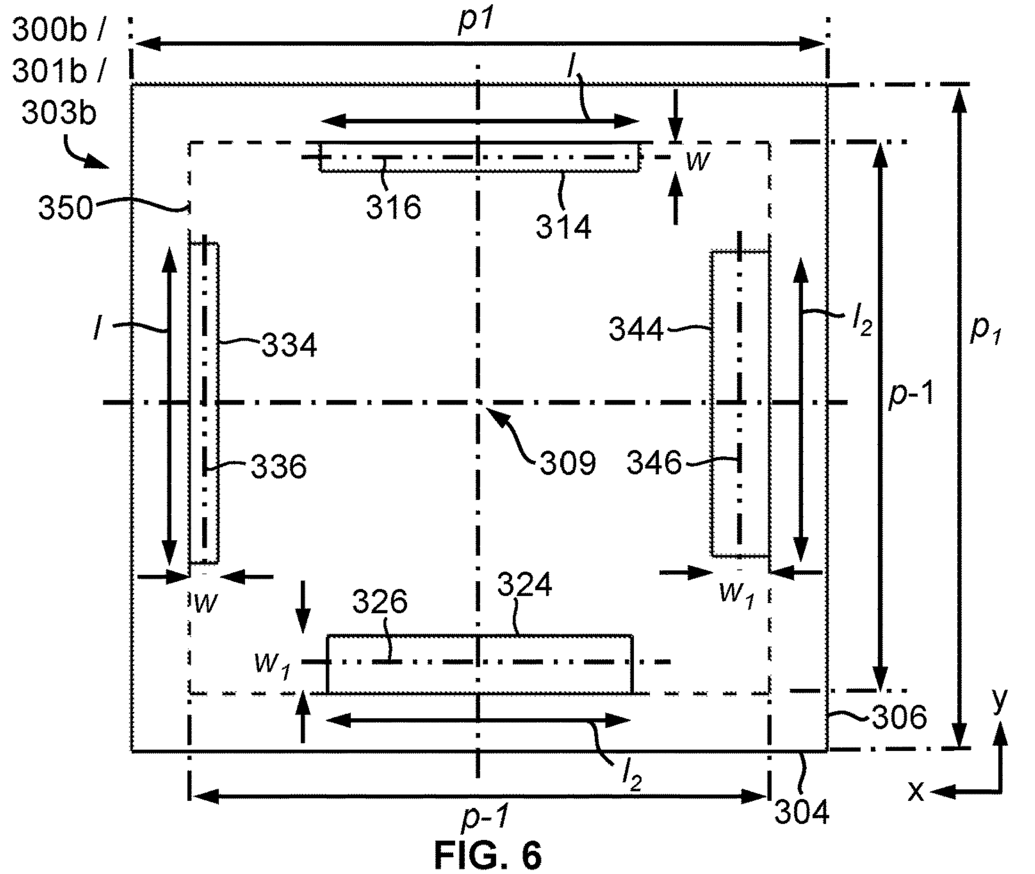
FIG. 6 is a rear view of the unit cell of FIG. 4.

The geometrical configurations of the first conductive elements 303*a* and the second conductive elements 303*b* will also be described with the aid of FIGS. 5 and 6. FIG. 5 schematically illustrates the first substrate surface 300*a* with the first conductive elements 303*a* disposed thereon. FIG. 6 illustrates the second substrate surface 300*b* with the second conductive elements 303*b* disposed thereon.

The first pair 310 of metallic strips 312/314 include at least one metallic strip 312 disposed on the first substrate surface 300*a* and one metallic strip 314 disposed on the second substrate surface 300*b*. The at least one metallic strip 312 and the metallic strip 314 are electrically insulated from one another by the substrate 300, i.e., without any electrical contact therebetween. Each of the metallic strips 312/314 of the first pair 310 of metallic strips extends wholly along a first straight axis 316 in a first orientation on a respective unit cell surface 301*a*/301*b*. Each of the metallic strips 312/314 is characterized by a substantially uniform width w (first width) and a substantially uniform cross-section. The metallic strip 314 on the second unit cell surface 301*b* extends along the first straight axis 316 for a first length l. At least one extremities of the at least one metallic strip 312 is in alignment along a normal axis 302 with a corresponding extremity of the metallic strip 314. In some embodiments, the first straight axis 316 is parallel to the first unit cell edge 304.

In some embodiments, the first pair 310 of the metallic strips 312/314 includes two metallic strips 312 disposed on the first substrate surface 300*a*, with the two metallic strips 312 being of similar lengths and separated by a first gap 312*a* of a gap length g. Each of the two metallic strips 312 extends wholly along the first straight axis 316 in the first orientation, on the plane defined by the first substrate surface 300*a*, with the two metallic strips 312 in alignment with one another. In the present disclosure, the overall length of two metallic strips 312, including the gap length of the intervening first gap 312*a*, is defined as a first length parameter l. In some embodiments, the first pair 310 of the metallic strips may be described as having only one metallic strip 312 of first length l (i.e., g=0) on the first unit cell surface 301*a*. For the purpose of the present disclosure, regardless of whether g=0 or g is non-zero, the at least one metallic strip 312 may be defined in terms of first length l and first width w, as shown in FIG. 5.

The second pair 320 of metallic strips 322/324 includes a metallic strip 322 disposed on the first unit cell surface 301*a* and another metallic strip 324 disposed on the second substrate surface 300*b*. Each of the second pair 320 of metallic strips is disposed on respective opposing sides (planes) of the substrate 300 such that the metallic strips 322/324 are insulated from one another by the substrate 300. Each of the second pair 320 of metallic strips wholly extends along a second straight axis 326 in a first orientation for a second length $l_2$. Each of the second pair 320 of metallic strips has a second width $w_1$, i.e., characterized by a substantially uniform sectional area along the second straight axis 326. Preferably, second width $w_1$ is similar to or greater than the first width w. Each of the second pair 320 of metallic strips 322/324 is aligned with one another along the normal axis 302. In the preferred embodiment illustrated, the second straight axis 326 is parallel to the first straight axis 316. In the preferred embodiment, the second straight axis 326 is parallel to the first unit cell edge 304.

The third pair 330 of metallic strips 332/334 include at least one metallic strip 332 disposed on the first substrate surface 300*a* and one metallic strip 334 disposed on the second substrate surface 300*b*. The at least one metallic strip 332 and the metallic strip 334 are insulated from one another by the substrate 300, i.e., without any direct contact therebetween. Each of the metallic strips 332/334 of the third pair 330 of metallic strips extends wholly along a third straight axis 336 in a second orientation on a respective substrate surface 300a/300b. Each of the metallic strips 332/334 is characterized by a substantially uniform width w (first width) and a substantially uniform cross-section. The metallic strip 334 on the second substrate surface 300b extends along the third straight axis 336 for the first length l. At least one extremities of the at least one metallic strip 332 is in alignment along a normal axis 302 with a corresponding extremity of the metallic strip 334. In some embodiments, the third straight axis 336 is parallel to a second unit cell edge 306, the second unit cell edge 306 being substantially orthogonal to the first unit cell edge 304.

In some embodiments, the third pair 330 of the metallic strips includes two metallic strips 332 disposed on the first substrate surface 300a, with the two metallic strips 332 being of similar lengths and separated by a second gap 332a of the gap length g. Each of the two metallic strips 332 extends wholly along the third straight axis 336 in the second orientation, on the plane defined by the first substrate surface 300a, with the two metallic strips 332 in alignment with one another. In the present disclosure, the overall length of two metallic strips 332, including the gap length of the intervening second gap 332a, is defined as the first length parameter l. In some embodiments, the third pair 330 of the metallic strips may be described as having only one metallic strip 332 of the first length l (i.e., g=0) on the first substrate surface 300a. For the purpose of the present disclosure, regardless of whether g=0 or g is non-zero, the at least one metallic strip 332 may be defined in terms of the first length l and the first width w, as shown in FIG. 5.

The fourth pair 340 of metallic strips includes a metallic strip 342 disposed on the first substrate surface 300a and another metallic strip 344 disposed on the second substrate surface 300b. Each of the fourth pair 340 of metallic strips is disposed on respective opposing sides (planes) of the substrate 300 such that the metallic strips 342/344 are insulated from one another by the substrate. Each of the fourth pair 340 of metallic strips wholly extends along a fourth straight axis 346 in the second orientation for the second length 12. Each of the fourth pair 340 of metallic strips has the second width $w_1$, i.e., characterized by a substantially uniform sectional area along the fourth straight axis 346. Preferably, second width $w_1$ is similar to or greater than the first width w. Each of the fourth pair 340 of metallic strips is aligned with one another along the normal axis 302. In the preferred embodiment illustrated, the fourth straight axis 346 is parallel to the third straight axis 336 and to the second unit cell edge 306.

Each of the four pairs 310/320/330/340 of metallic strips is spaced apart from and not in electrical connection with any other of the four pairs 310/320/330/340 of metallic strips. In some embodiments, the first conductive elements 303a and the second conductive elements 303b together define a (p−1)×(p−1) functional region 350 within the substrate surface 300a/300b ($p_1 \times p_1$). In some embodiments, the first pair 310 of metallic strips, the second pair 320 of metallic strips, the third pair 330 of metallic strips and the fourth pair 340 of metallic strips collectively define the functional region 350. Alternatively described, the functional region is defined by the outer edges of the metallic strips 312/322/332/342 (314/324/334/344) or by the outer edges/boundaries of the first/second conductive elements 303a/303b. The functional region 350 may be centrally aligned relative to a geometric center 309 of the unit cell 200. Each of the four pairs of metallic strips 310/320/330/340 is spaced apart from respective proximal unit cell edges 304/306.

For a quadrilateral functional region 350 in which the respective sides of the quadrilateral region 350 are defined by the first conductive elements 303a and the second conductive elements 303b, the corners of the functional region 350 are devoid of the first/second conductive elements or of any metallic material, i.e., none of the metallic strips 312/322/332/342 (314/324/334/344) extends to any of the corners of the functional region 350 or to any of the corners of the first/second substrate surfaces 300a/300b. The first/second conductive elements 303a/303b are disposed along straight parts of the perimeter of the functional region 350. The functional region 350 is devoid of any metallic material or the first/second conductive elements. That is, none of the metallic strips 312/322/332/342 (314/324/334/344) extends into the center part of the functional region 350. Each of the metallic strips 312/322/332/342 (314/324/334/344) may have a quadrilateral shape or profile oriented along one of the first orientation and the second orientation. Each of the plurality of the unit cells 200 is operable even if it is rotated through multiples of 90° about its geometric center 309. For example, in one array, the unit cell 200 may be oriented in a reference orientation, and in another array, the same unit cell 200 may be oriented in a rotated orientation, in which the rotated orientation is a rotational displacement relative to the reference orientation about the respective geometric center 309 of the unit cell 200. In other words, the unit cell 200 works even if it is rotated.

The diagonal plane 308 may divide the unit cell 200 into a first region and a second region. FIG. 7 is an exploded partial view of the unit cell 200 showing the substrate of the first region. The first region includes the first pair of metallic strips 310 and the fourth pair of metallic strips 340. The second region includes the second pair of metallic strips 320 and the third pair of metallic strips 330. The unit cell 200 is configured such that the first region is symmetrical to the second region about the diagonal plane 308.

As illustrated in FIG. 7, the at least one metallic strip 312 and the metallic strip 314 are aligned along or in the direction of the normal axis 302 (normal to the first substrate surface and the second substrate surface) such that their respective footprints 318 coincide, substantially superimpose, or overlap one another. In the present disclosure, the term “footprint” refers to the area or real estate occupied by a metallic strip on the substrate. In other words, the outer edges of the metallic strips 312/314 are congruent with one another. In other words, the first conductive elements 303a are congruent with or have coincident footprints 318 with the corresponding conductive elements 303b of the same unit cell 200 (for the purpose of defining the footprint, the first gap or the second gap which may be define “inner edges” in some of the metallic strips 312/332 is ignored).

Similarly, the metallic strip 322 and the metallic strip 324 are aligned along or in the direction of the normal axis 302 such that their respective footprints 328 substantially superimpose or overlap one another. In other words, the outer edges of the metallic strips 322/324 are congruent with one another.

Similarly, the at least one metallic strip 332 and the metallic strip 334 are aligned along or in the direction of the normal axis 302 such that their respective footprints 338 substantially superimpose or overlap one another. In other words, the outer edges of the metallic strips 332/334 are congruent with one another.

Similarly, the metallic strip 342 and the metallic strip 344 are aligned along or in the direction of the normal axis 302 such that their respective footprints 348 substantially superimpose or overlap one another. In other words, the outer edges of the metallic strips 342/344 are congruent with one another.

In some examples, the first gap 312*a* of the metallic strip 312 and the second gap 332*a* of the metallic strip 332 are configured with the same gap length g. The same gap length g may be in the range from about 0.1 mm (millimeter) to about 0.3 mm. The first width w may be about 0.1 mm and the second width $w_1$ may be in a range of about 0.1 mm to about 0.2 mm. The first length l may be in a range of about 0.6 mm to about 1.55 mm. The second length $l_2$ may be in a range of about 0.95 mm to about 1.2 mm.

The exemplary Huygens lens 100 illustrated in FIGS. 4 to 6 is configurable to operate in a dual polarized mode. In other embodiments of the present disclosure, the Huygens lens 100 may include only two pairs of metallic strips such that the Huygens lens 100 is easily adapted or configurable to operate in a single polarized mode. For example, in some applications, the first conductive elements 303*a* may include only two operable metallic strips 312/322 of the same orientation and the second conductive elements 303*b* may include only two operable corresponding metallic strips 314/324 for the polarization in the x-direction. In some examples, the first conductive elements 303*a* may include only two operable metallic strips 332/342 of the same orientation and the second conductive elements 303*b* may include only two operable corresponding metallic strips 334/344 for polarization in the y-direction. In some other embodiments, only two of four pairs of metallic strips are rendered operable at a time such that the Huygens lens 100 is configured for single polarization. For example, the Huygens lens 100 may be provided with only two operable pairs of metallic strips 332/334 and 342/344 both of the same second orientation for the polarization in y-direction. The Huygens lens 100 of the present disclosure is thus operable in a dual polarized mode and in a single polarized mode, in which the Huygens lens 100 in the dual polarized mode is configured to concurrently operate in the x-direction polarization and the y-direction polarization. The Huygens lens 100 in the single polarized mode may be configured to operate in no more than one of the x-direction polarization and the y-direction polarization.

The operability of the unit cell 200 of the present disclosure has been verified in the W-band of the electromagnetic spectrum. In non-limiting examples provided solely for illustrative purposes to aid understanding, simulation results for an embodiment of the unit cell 200 are shown in FIGS. 8 to 11.

Figure 9:
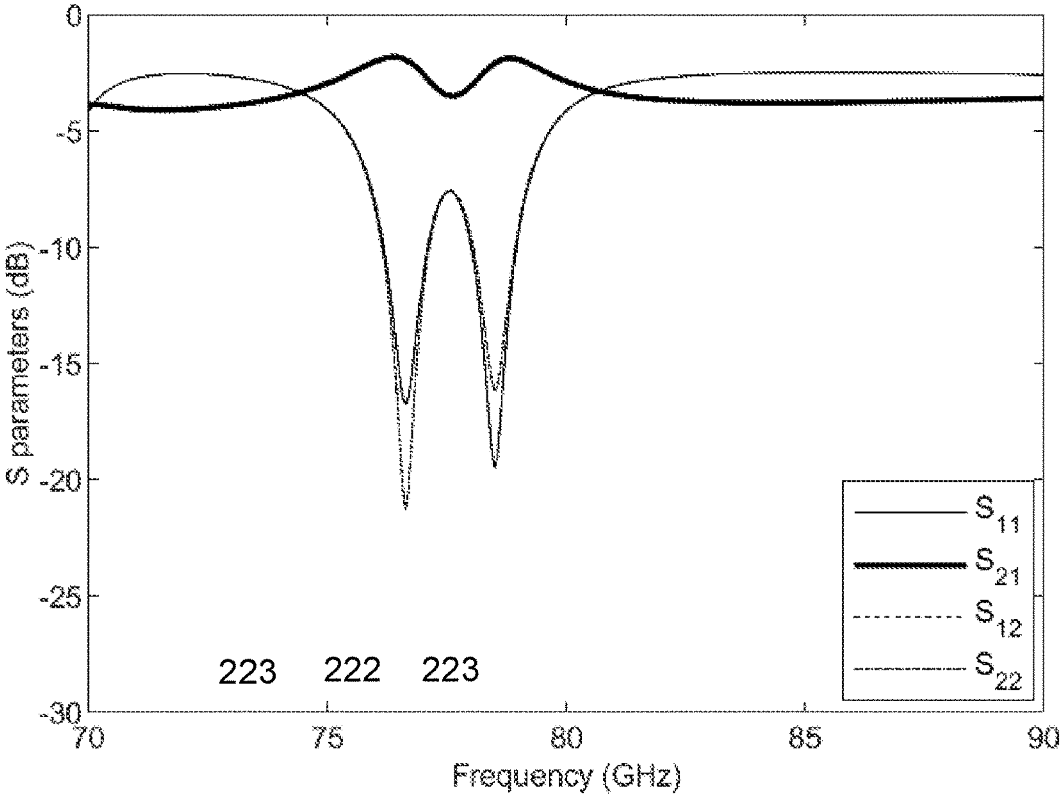
FIG. 9 shows a simulated S parameter magnitude response for polarization in a y-direction of the unit cell of FIG. 8.
Figure 10:
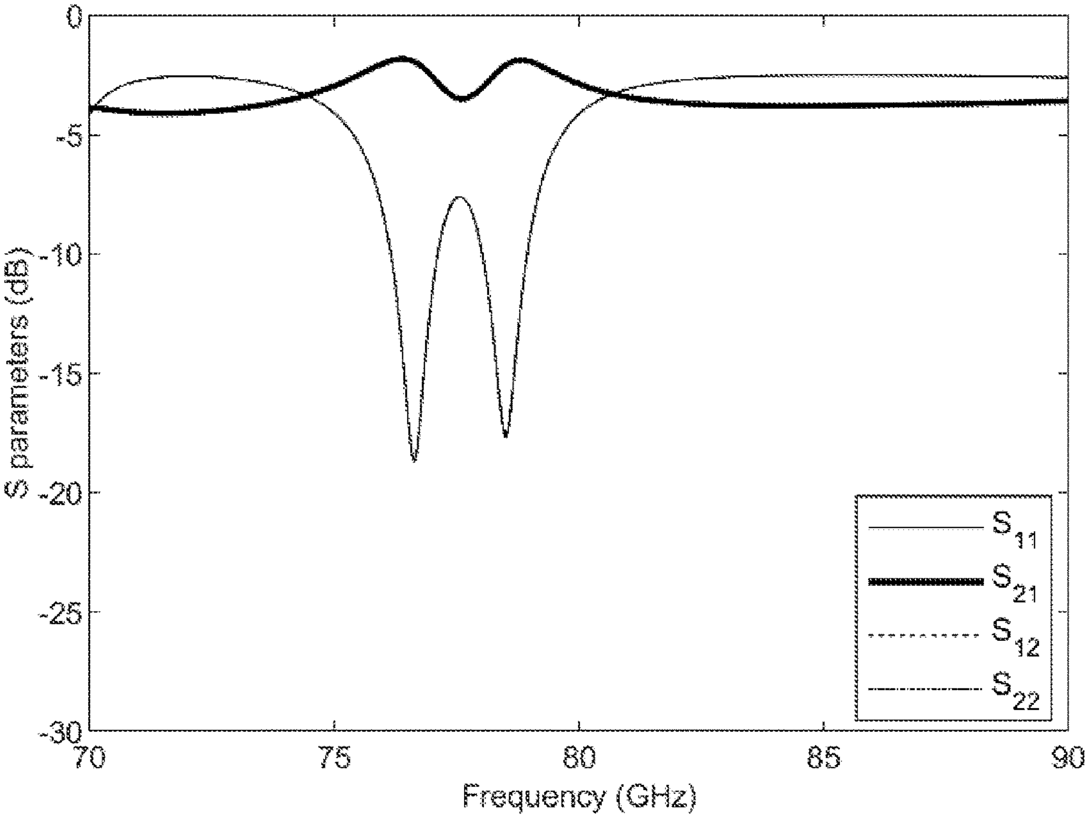
FIG. 10 shows a simulated S parameter magnitude response for polarization in an x-direction of the unit cell of FIG. 8.
Figure 11:
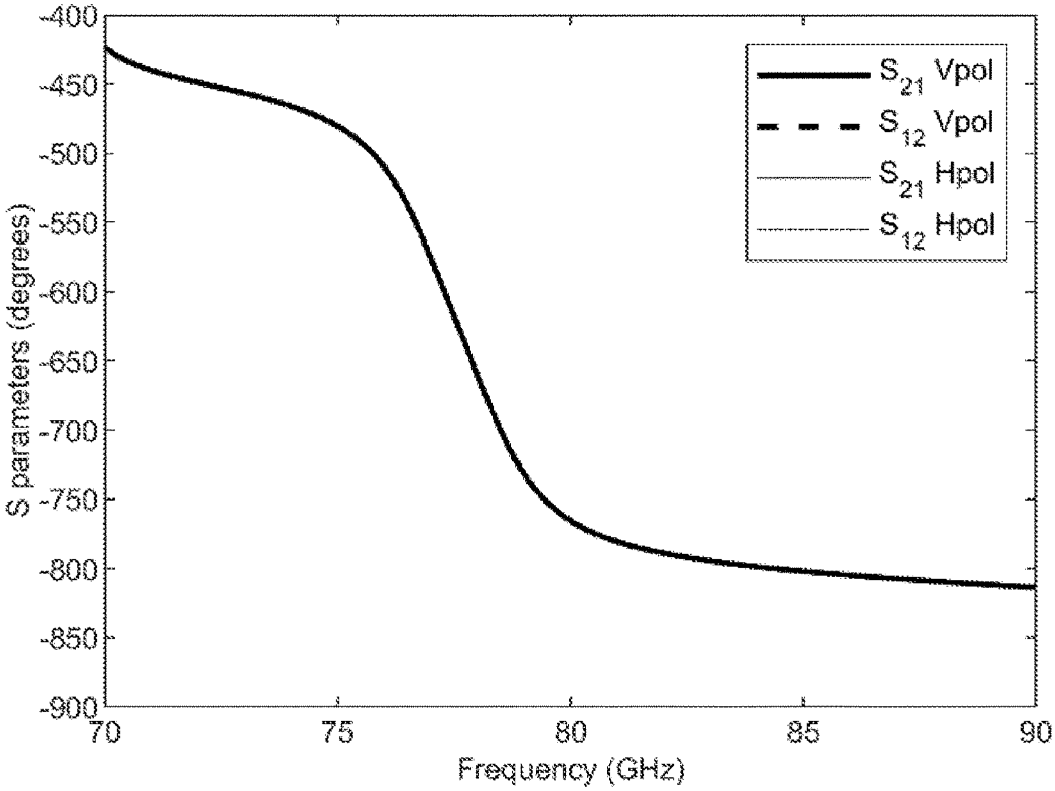
FIG. 11 shows a phase response for polarizations in the y-direction and x-direction of the unit cell of FIG. 8.

In one example, the unit cell 200 is characterized with the following parameters: l=1.3 mm, $l_2$=1 mm, $p_1$=2.4 mm, p=2.2 mm, g=0 mm, w=0.1 mm, and $w_1$=0.2 mm. The normalized electric admittance and the normalized magnetic impedance in the y-direction are simulated and shown in FIG. 8. It can be observed from FIG. 8 that the Huygens resonance of the unit cell 200 occurs at 78.494 GHZ, confirming that the unit cell 200 is operable in the W-band of the electromagnetic spectrum. FIG. 9 shows the S parameters response for the unit cell 200 with polarization in the y-direction, showing that the unit cell 200 is operable in a y-direction or vertical polarization and FIG. 10 shows the S parameters response with polarization in a x-direction or horizontal polarization. FIG. 11 shows the phase response for polarizations in the y-direction (vertical polarization) and the x-direction (horizontal polarization). In other words, the simulation results verify that the unit cell 200 is operable in dual polarization mode in the W-band of the electromagnetic spectrum.

Figure 12B:
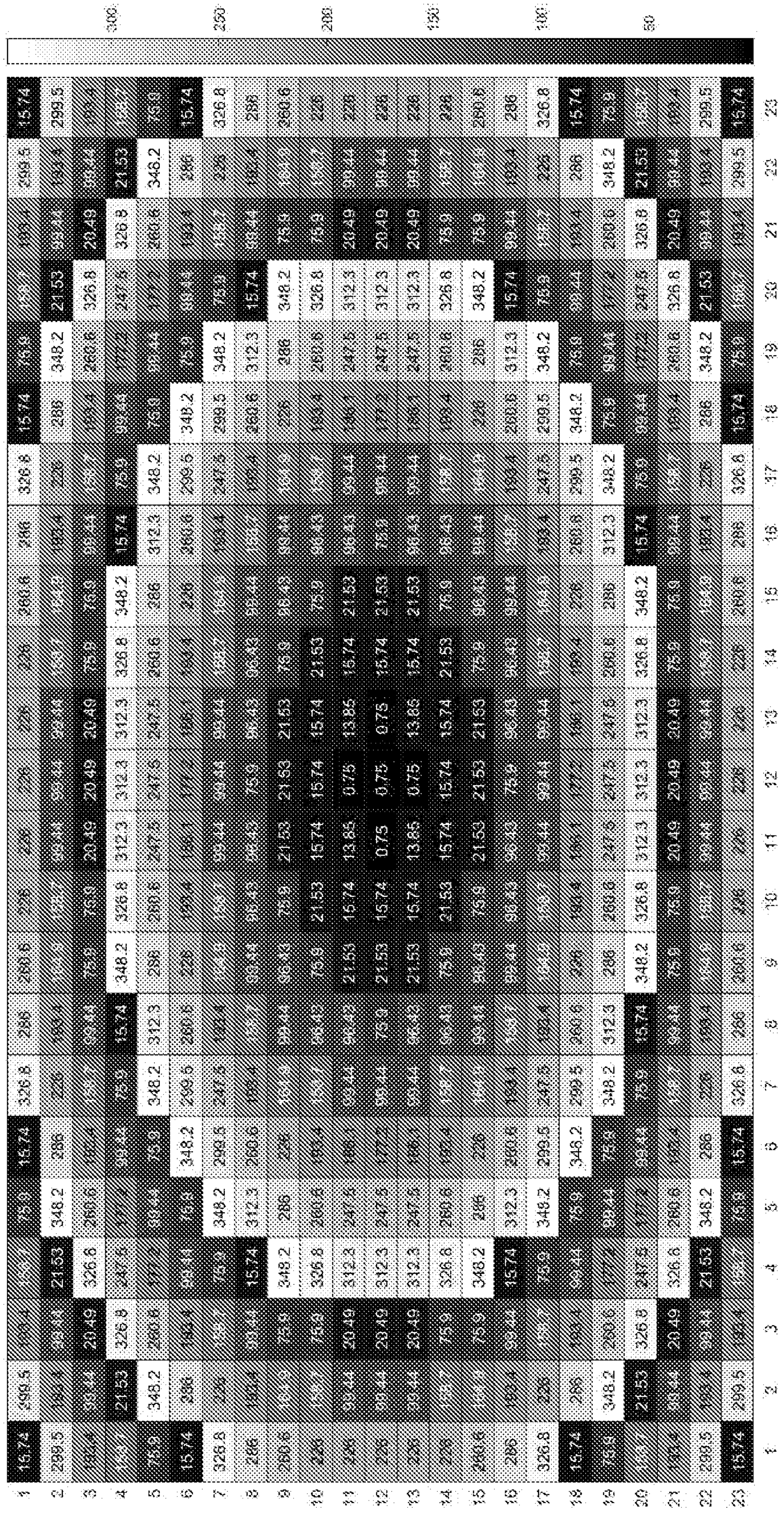

FIG. 12A and FIG. 12B graphically illustrate the phase distribution of the first array 100*a* and the second array 100*b* respectively. FIG. 12A shows the phase value of each unit cell 200 in the array across the Huygens lens 100. In FIG. 12B, the phases are shaded according to bands (or ranges) of phases, so as to better illustrate the concentric phase distribution. The first metallic configuration 303*a* and the corresponding second metallic configuration 303*b* are configured such that by varying the unit cell parameters (e.g., the physical dimensions of the metallic strips), different phases can be obtained for the unit cell 200.

Table 1 shows an exemplary range of phases forming the Huygens lens 100 of FIG. 12A. The various phases can be obtained by varying the size of the functional region (p−1)×(p−1), the respective lengths (l, $l_2$) and widths (w, $w_1$) of the metallic strips, and/or the gap length (g) of unit cells of the first metallic configuration 303*a* on the first substrate surface 300*a* and on the second substrate surface 300*b* (g=0 on the second substrate surface 300*b*). As shown, it is possible to obtain a range of phases from about zero (e.g., 0.75 degrees) to about 360 degrees or near-360 degrees (e.g., 348.2 degrees) by varying the unit cell parameters of the metallic configuration 303*a*/303*b*.

TABLE 1

| Phase | Dimensions in millimeters (mm) |
|---|---|
| 0.75 | l = 1.1, $l_2$ = 1.05, p = 2.1, g = 0.1, w = 0.1 and $w_1$ = 0.1 |
| 13.85 | l = 1.1, $l_2$ = 1.05, p = 2.2, g = 0, w = 0.1 and $w_1$ = 0.2 |
| 15.74 | l = 1.2, $l_2$ = 1, p = 2.2, g = 0.3, w = 0.1 and $w_1$ = 0.2 |
| 20.49 | l = 1.3, $l_2$ = 1, p = 2.2, g = 0, w = 0.1 and $w_1$ = 0.2 |
| 21.53 | l = 1.2, $l_2$ = 1, p = 2.2, g = 0, w = 0.1 and $w_1$ = 0.15 |
| 75.9 | l = 1.5, $l_2$ = 1, p = 2.1, g = 0, w = 0.1 and $w_1$ = 0.1 |
| 96.43 | l = 1.3, $l_2$ = 1, p = 2.1, g = 0, w = 0.1 and $w_1$ = 0.1 |
| 99.44 | l = 0.9, $l_2$ = 0.95, p = 2.4, g = 0, w = 0.1 and $w_1$ = 0.15 |
| 158.66 | l = 0.9, $l_2$ = 0.95, p = 2.4, g = 0, w = 0.1 and $w_1$ = 0.1 |
| 164.87 | l = 0.9, $l_2$ = 0.95, p = 2.3, g = 0.1, w = 0.1 and $w_1$ = 0.1 |
| 177.18 | l = 1.3, $l_2$ = 1, p = 2, g = 0.3, w = 0.1 and $w_1$ = 0.1 |
| 186.07 | l = 1.5, $l_2$ = 0.95, p = 2, g = 0, w = 0.1 and $w_1$ = 0.15 |
| 193.38 | l = 1.1, $l_2$ = 1, p = 2, g = 0.3, w = 0.1 and $w_1$ = 0.1 |
| 226 | l = 1.3, $l_2$ = 0.95, p = 2, g = 0, w = 0.1 and $w_1$ = 0.1 |
| 247.53 | l = 1.3, $l_2$ = 0.8, p = 1.8, g = 0.3, w = 0.1 and $w_1$ = 0.2 |
| 260.59 | l = 0.6, $l_2$ = 0.6, p = 2.2, g = 0.3, w = 0.1 and $w_1$ = 0.2 |
| 286.04 | l = 1.3, $l_2$ = 1.2, p = 2.3, g = 0.3, w = 0.1 and $w_1$ = 0.1 |
| 299.47 | l = 1.3, $l_2$ = 1.2, p = 2.1, g = 0.3, w = 0.1 and $w_1$ = 0.2 |
| 312.28 | l = 1.1, $l_2$ = 1.2, p = 2.1, g = 0.3, w = 0.1 and $w_1$ = 0.1 |
| 326.77 | l = 1.2, $l_2$ = 1.05, p = 2.2, g = 0, w = 0.1 and $w_1$ = 0.15 |
| 348.2 | l = 1.4, $l_2$ = 1.05, p = 2.1, g = 0, w = 0.1 and $w_1$ = 0.15 |

FIG. 13 shows the difference between the phases between the Huygens lens 100 of FIG. 12A and the preferred embodiment of FIG. 3A. It can be seen from FIG. 13 that the difference between any one of the unit cells 200 of FIG. 12A and corresponding unit cell of FIG. 3A does not exceed 30 degrees. In other words, a tolerance or variation of up to 30 degrees in the phase can still fulfil the performance requirement of the Huygens lens 100. Further, a relatively large number of unit cells 200 in FIG. 12A are within 15 degrees of the preferred phase value of the corresponding unit cell in FIG. 3A.

FIG. 14 illustrates the respective transmission amplitude related to each of the unit cell 200 in the Huygens lens 100 of FIG. 12A. It can be observed that each of the unit cell 200 is configured to provide a transmission greater than-3.25 dB (decibels) to the W-band electromagnetic spectrum. This level of transmission amplitude is relatively high and thus indicative of the viability of using the Huygens lens of FIG. 12A in actual applications.

Figure 15:
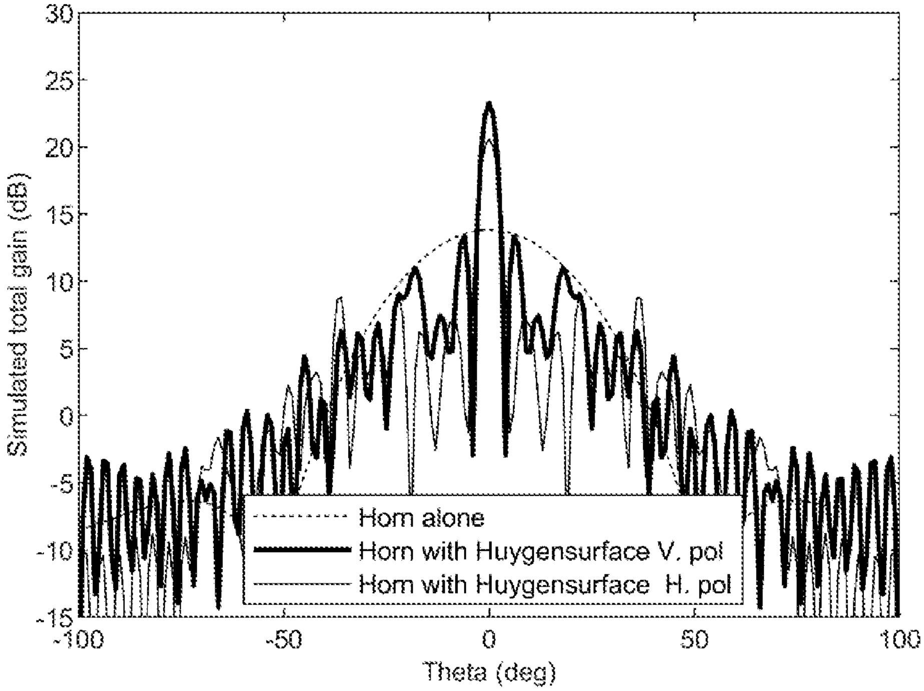
FIG. 15 shows the simulated gain of a horn antenna with and without the Huygens lens of FIG. 12 for polarizations in the y-direction and x-direction.

The Huygens lens 100 is simulated at a frequency of 78.5 GHZ, which is within the W-band, with a horn antenna at the focal point of the Huygens lens 100. The simulated gain of the horn antenna with and without the exemplary Huygens lens 100 at 78.5 GHz is shown in FIG. 15. It can be seen that with the provision of the exemplary Huygens lens 100, the gain of the horn antenna is elevated in both polarization directions. The horn antenna without the exemplary Huygens lens 100 has realized gain of 13.8 dBi. With the Huygens lens, the gain of the antenna increases to 23.3 dBi for polarization in the y-direction (vertical polarization) and to 20.6 dBi for polarization in the x-direction (horizontal polarization). This demonstrates the viability of the Huygens lens 100 as disclosed herein. The simulated 3 dB beam width of the horn antenna alone is 38.18 degrees. With the Huygens lens 100, the 3 dB beam width of the antenna is 3.48 degrees in the vertical polarization and 4.36 degrees in the horizontal polarization. This illustrates the dual polarization nature of the exemplary Huygens lens 100.

Table 2 shows the dimensions and corresponding phases according to another embodiment of the Huygens lens 100 of the present disclosure. Similar to the other examples described, the unit cell 200 of the present disclosure can be configured to a phase between 0 to 360 degrees, i.e., a phase selected from a range from 0 to near-360 degrees. It can be appreciated that the first metallic configuration 303*a* and the second metallic configuration 303*b* provides for easy tuning of the phase of each unit cell 200, such that a Huygens lens can be formed based on an array of the unit cells 200 of the present disclosure.

TABLE 2

| Phase | Dimensions in millimeters (mm) |
|---|---|
| 0.75 | l = 1.1, $l_2$ = 1.05, p = 2.1, g = 0.1, w = 0.1 and $w_1$ = 0.1 |
| 13.85 | l = 1.1, $l_2$ = 1.05, p = 2.2, g = 0, w = 0.1 and $w_1$ = 0.2 |
| 20.49 | l = 1.3, $l_2$ = 1, p = 2.2, g = 0, w = 0.1 and $w_1$ = 0.2 |
| 30.62 | l = 1, $l_2$ = 1, p = 2.3, g = 0, w = 0.1 and $w_1$ = 0.1 |
| 44.71 | l = 1.2, $l_2$ = 1, p = 2.2, g = 0, w = 0.1 and $w_1$ = 0.2 |
| 75.9 | l = 1.5, $l_2$ = 1, p = 2.1, g = 0, w = 0.1 and $w_1$ = 0.1 |
| 99.44 | l = 0.9, $l_2$ = 0.95, p = 2.4, g = 0, w = 0.1 and $w_1$ = 0.15 |
| 139.08 | l = 1.2, $l_2$ = 1, p = 2.1, g = 0, w = 0.1 and $w_1$ = 0.1 |
| 158.22 | l = 1.55, $l_2$ = 0.95, p = 2.1, g = 0, w = 0.1 and $w_1$ = 0.2 |
| 164.87 | l = 0.9, $l_2$ = 0.95, p = 2.3, g = 0.1, w = 0.1 and $w_1$ = 0.1 |
| 178.5 | l = 1.55, $l_2$ = 0.95, p = 2, g = 0, w = 0.1 and $w_1$ = 0.15 |
| 186.07 | l = 1.5, $l_2$ = 0.95, p = 2, g = 0, w = 0.1 and $w_1$ = 0.15 |
| 193.38 | l = 1.1, $l_2$ = 1, p = 2, g = 0.3, w = 0.1 and $w_1$ = 0.1 |
| 229.47 | l = 1.2, $l_2$ = 0.9, p = 1.8, g = 0.3, w = 0.1 and $w_1$ = 0.15 |
| 247.53 | l = 1.3, $l_2$ = 0.8, p = 1.8, g = 0.3, w = 0.1 and $w_1$ = 0.2 |
| 260.59 | l = 0.6, $l_2$ = 0.6, p = 2.2, g = 0.3, w = 0.1 and $w_1$ = 0.2 |
| 286.04 | l = 1.3, $l_2$ = 1.2, p = 2.3, g = 0.3, w = 0.1 and $w_1$ = 0.1 |
| 299.47 | l = 1.3, $l_2$ = 1.2, p = 2.1, g = 0.3, w = 0.1 and $w_1$ = 0.2 |
| 314.91 | l = 1.2, $l_2$ = 1.1, p = 2.1, g = 0.3, w = 0.1 and $w_1$ = 0.1 |
| 326.77 | l = 1.2, $l_2$ = 1.05, p = 2.2, g = 0, w = 0.1 and $w_1$ = 0.15 |
| 348.2 | l = 1.4, $l_2$ = 1.05, p = 2.1, g = 0, w = 0.1 and $w_1$ = 0.15 |

Figure 18A:
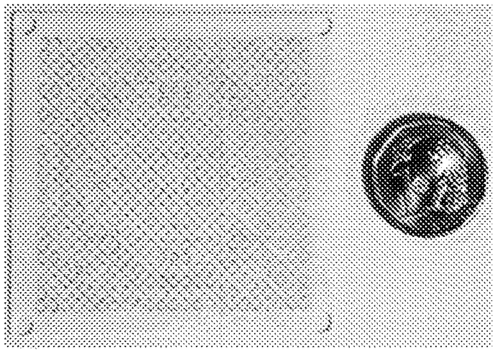
FIGS. 18A and 18B are images of a prototype Huygens lens of the present disclosure.
Figure 18B:
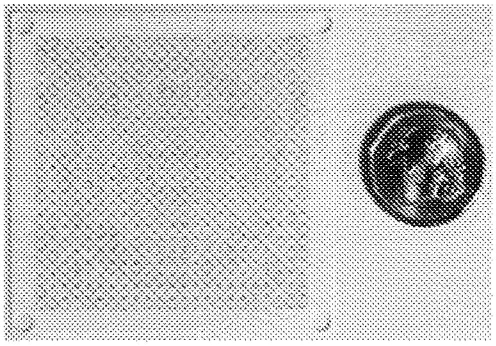

Prototypes of the Huygens lens 100 were also fabricated as shown in FIGS. 18A and 18B (images of opposing surfaces of the protype Huygens lens next to a Singapore dollar coin of about 22.4 mm diameter). Various dielectric materials may be selected for use as the substrate 300. In these examples, the dielectric material used was RO4350B™ laminate (thickness of 0.508 mm, dielectric constant of 3.66, and loss tangent of 0.037 at 10 GHz) available from Rogers Corporation. The metallic strips may be deposited, printed, or otherwise formed on the respective substrate surfaces to form a 23×23 array of unit cells 200 on a unitary piece of the substrate 300.

Figure 16:
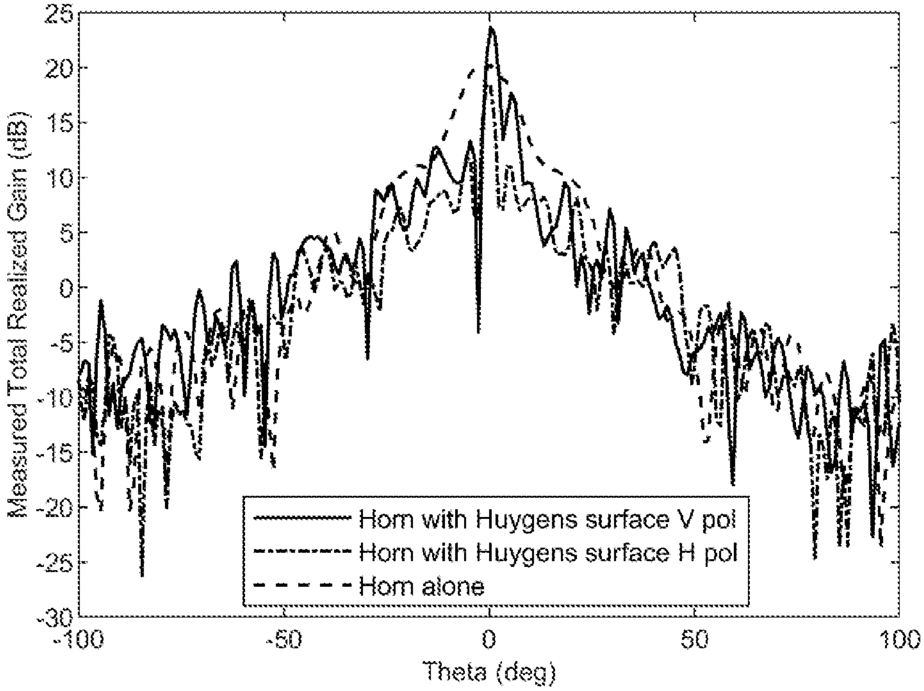
FIG. 16 shows the measured radiation pattern of the horn antenna with and without the Huygens lens of FIG. 12 for polarizations in y-direction and x-direction in an X-Z plane.
Figure 17:
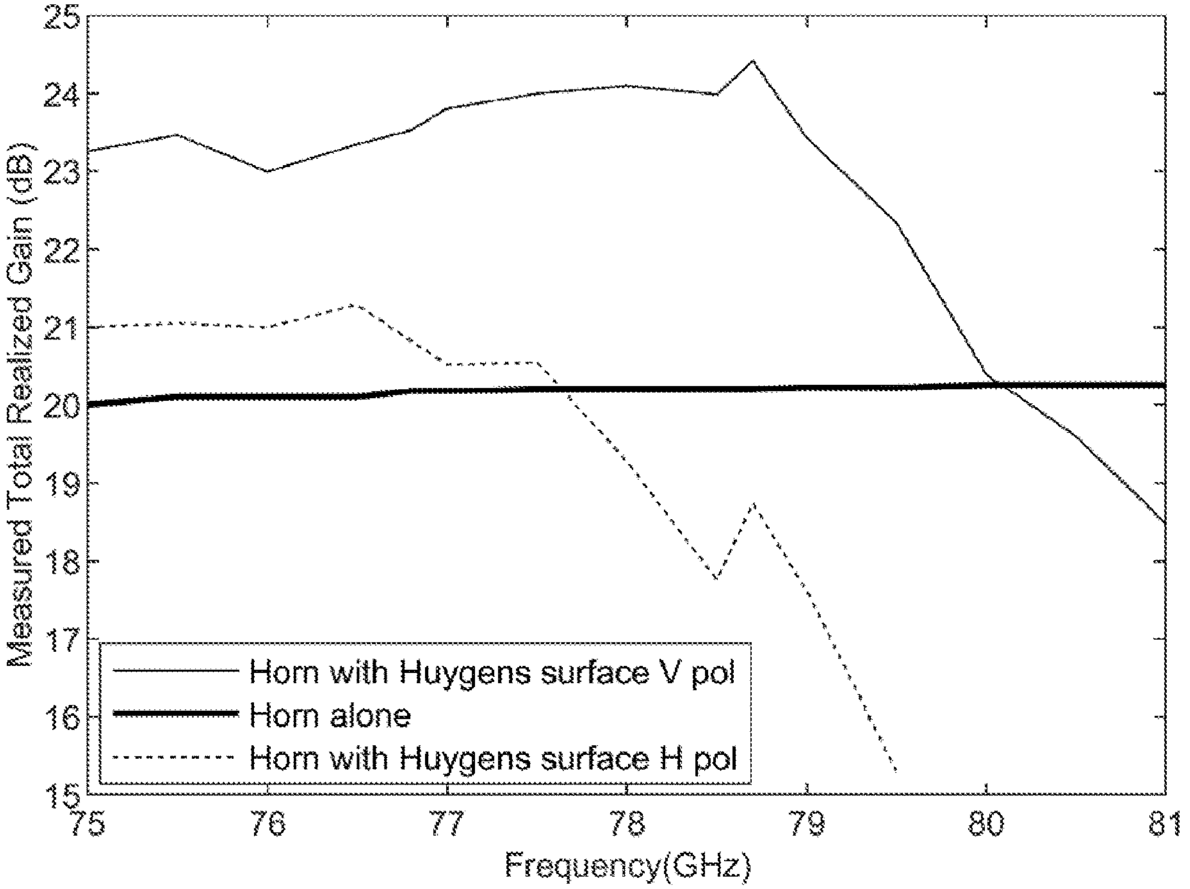
FIG. 17 shows the measured total realized gain of the horn antenna with and without the Huygens lens of FIG. 12 at different frequencies.

The Huygens lens 100 is experimentally tested by placing the Huygens lens 100 at the focal distance of 54 mm from a horn antenna, which has a gain of 20 dBi. The measured radiation patterns of the horn antenna at 78.7 GHZ (within W-band) alone and with the Huygens lens 100 or Huygens surface in two orthogonal polarization directions, e.g., both vertical polarization and horizontal polarization in XZ plane (ϕ=0) are shown in FIG. 16. The measured 3 dB beam width of the horn antenna alone is 13.06 degrees. The 3 dB beam width of the horn antenna with the Huygens lens 100 is 2.66 degrees in the vertical polarization and is 2.7 degrees in the horizontal polarization. The measured total realized gain of the horn antenna at 78.7 GHz is 20.2 dBi while the realized gain of the horn antenna with the Huygens lens 100 is 24.42 dBi in vertical polarization is 24.42 dBi, and 18.74 dBi in the horizontal polarization is 18.74 dBi. The reason for the lower gain in horizontal polarization is due to the bandwidth of the Huygens lens 100 being lower in the horizontal polarization. As shown in FIG. 17, the measured total realized gains of the horn antenna with and without the Huygens lens are plotted across a range of frequencies which includes the W-band. It can be seen that the bandwidth for the horizontal polarization is from 75 GHz to 77.5 GHZ, while the bandwidth for vertical polarization is from 75 GHz to 80 GHz. This demonstrates that dual polarization mode is at least feasible for electromagnetic waves in the bandwidth from 75 GHz to 77.5 GHZ, which is well within the W-band of the electromagnetic spectrum.

All examples described herein, whether of apparatus, methods, materials, or products, are presented for the purpose of illustration and to aid understanding and are not intended to be limiting or exhaustive. Various changes and modifications may be made by one of ordinary skill in the art without departing from the scope of the invention as claimed.

The invention claimed is:

1. A Huygens lens, comprising:

a substrate of a dielectric material, the substrate having a first substrate surface and a second substrate surface, the second substrate surface opposing the first substrate surface;

first conductive elements disposed on the first substrate surface; and second conductive elements disposed on the second substrate surface, the second conductive elements being electrically insulated from the first conductive elements by the substrate, wherein the first conductive elements and the second conductive elements form an array of a plurality of unit cells, the array having a concentric phase distribution, each of the plurality of unit cells being operable within a range of frequencies, the range of frequencies including at least a part of a W-band of an electromagnetic spectrum, wherein for each of the plurality of unit cells, the first conductive elements and the second conductive elements define respective sides of a quadrilateral functional region, wherein the quadrilateral functional region is devoid of any metallic material, and wherein the first conductive elements and the second conductive elements do not extend to each corner of the quadrilateral functional region.

2. The Huygens lens as recited in claim 1, wherein the first conductive elements and the second conductive elements comprise a plurality of metallic strips, the plurality of metallic strips comprising:

a first pair of metallic strips disposed on the first substrate surface and the second substrate surface respectively, each of the first pair of metallic strips wholly extending along a first straight axis in a first orientation;

a second pair of metallic strips disposed on the first substrate surface and the second substrate surface respectively, each of the second pair of metallic strips wholly extending along a second straight axis in the first orientation;

a third pair of metallic strips disposed on the first substrate surface and the second substrate surface respectively, each of the third pair of metallic strips wholly extending along a third straight axis in a second orientation, the second orientation being orthogonal to the first orientation; and a fourth pair of metallic strips disposed on the first substrate surface and the second substrate surface respectively, each of the fourth pair of metallic strips wholly extending along a fourth straight axis in the second orientation, wherein each of the plurality of metallic strips is spaced apart from any other of the plurality of metallic strips.

3. The Huygens lens of as recited in claim 2, wherein the first conductive elements and the second conductive elements are aligned along a normal axis such that the respective footprints of the first conductive elements and the second conductive elements coincide, wherein the normal axis is a normal of the first substrate surface and the second substrate surface.

4. The Huygens lens as recited in claim 1, wherein the quadrilateral functional region is characterized by a dimension of (p−1)×(p−1,) and wherein p ranges from 2.0 mm to 2.4 mm inclusive.

5. The Huygens lens as recited in claim 1, wherein the first conductive elements and the second conductive elements are disposed such that the each of the plurality of unit cells is characterized by reflective symmetry about a diagonal plane of the unit cell.

6. The Huygens lens as recited in claim 1, wherein each of the plurality of unit cells is operable in each of a reference orientation and a rotated orientation, wherein the rotated orientation is rotationally displaced relative to the reference orientation about a respective geometric center.

7. The Huygens lens as recited in claim 1, wherein the Huygens lens is operable in a dual polarized mode and a single polarized mode, and wherein the Huygens lens in the dual polarized mode is configured to concurrently operate in a x-direction polarization and a y-direction polarization, and wherein the Huygens lens in the single polarized mode is configured to operate in no more than one of the x-direction polarization and the y-direction polarization.

8. The Huygens lens as recited in claim 1, wherein each of the plurality of unit cells is configured with a phase value determined by dimensions of the first conductive elements and the second conductive elements.

9. The Huygens lens as recited in claim 1, wherein the array comprises multiple unit cells with respective phase values in each of a plurality of bands of phases, the plurality of bands of phases including phase values ranging from 0 degree inclusive to 360 degrees exclusive.

10. The Huygens lens as recited in claim 1, wherein the array is configured to be operable in a region of the electromagnetic spectrum, and wherein the region overlaps with at least a portion of the W-band of the electromagnetic spectrum.

11. The Huygens lens as recited in claim 1, wherein first conductive elements and the second conductive elements are dimensioned such that the Huygens lens is operable in the W-band of the electromagnetic spectrum.

12. The Huygens lens as recited in claim 1, wherein each of the plurality of unit cells is characterized by a transmission amplitude of greater than −3.25 dB.

13. The Huygens lens as recited in claim 2, wherein the first pair of metallic strips and the third pair of metallic strips are characterized by a first width, and wherein the second pair of metallic strips and the fourth pair of metallic strips are characterized by a second width, and wherein the second width is equal to or greater than the first width.

14. The Huygens lens as recited in claim 2, wherein the first pair of metallic strips and the third pair of metallic strips are characterized by a first length, and wherein the second pair of metallic strips and the fourth pair of metallic strips are characterized by a second length.

15. The Huygens lens as recited in claim 2, wherein at least one of the first pair of metallic strips and the third pair of metallic strips comprises:

one rectangular metallic strip disposed on the second substrate surface; and two rectangular metallic strips disposed on the first substrate surface, the two rectangular metallic strips being axially aligned, wherein respective ends of the two rectangular metallic strips define a gap therebetween.

16. The Huygens lens as recited in claim 2, wherein the first pair of metallic strips and the third pair of metallic strips are characterized by a first width, and wherein the second pair of metallic strips and the fourth pair of metallic strips are characterized by a second width, and wherein the second width is equal to or greater than the first width, wherein the first pair of metallic strips and the third pair of metallic strips are characterized by a first length, and wherein the second pair of metallic strips and the fourth pair of metallic strips are characterized by a second length, wherein at least one of the first pair of metallic strips and the third pair of metallic strips comprises one rectangular metallic strip disposed on the second substrate surface; and two rectangular metallic strips disposed on the first substrate surface, the two rectangular metallic strips being axially aligned, wherein respective ends of the two rectangular metallic strips define a gap therebetween, wherein the gap ranges from 0 mm to 0.3 mm inclusive, the first width is 0.1 mm, the second width ranges from 0.1 mm to 0.2 mm inclusive, the first length ranges from 0.6 mm to 1.4 mm inclusive, the second length ranges from 0.95 mm to 1.2 mm inclusive, and p ranges from 1.8 mm to 2.4 mm, and $p_1$ is a constant value of 2.4 mm, $p_1$ being a periodicity of the array, and p being part of a dimension (p−1)×(p−1) that characterizes a quadrilateral functional region of the array.

17. An antenna system comprising:

the Huygens lens according to claim 1; and an antenna disposed at a focal point of the Huygens lens, the Huygens lens being configured to increase a gain of the antenna in a dual polarization mode.

18. The antenna system of claim 17, wherein the Huygens lens is operable at a frequency ranging from 75 GHz to 80 GHz.

19. The antenna system of claim 17, wherein the Huygens lens comprises a 23×23 array of the plurality of unit cells, and wherein each of the plurality of unit cells defines an area of 2.4 mm×2.4 mm.

* * * * *